US011636529B2

(12) United States Patent
Jeong et al.

(10) Patent No.: US 11,636,529 B2
(45) Date of Patent: Apr. 25, 2023

(54) METHOD AND DEVICE FOR PROVIDING KEYWORDS RELATED TO PRODUCT INFORMATION INCLUDED IN IMAGE

(71) Applicant: Samsung Electronics Co., Ltd., Gyeonggi-do (KR)

(72) Inventors: Seunghwan Jeong, Gyeonggi-do (KR); Jaeyong Yang, Gyeonggi-do (KR); Saemee Yim, Gyeonggi-do (KR); Jiyoon Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 17/266,665

(22) PCT Filed: Jun. 21, 2019

(86) PCT No.: PCT/KR2019/007527
§ 371 (c)(1),
(2) Date: Feb. 8, 2021

(87) PCT Pub. No.: WO2020/032384
PCT Pub. Date: Feb. 13, 2020

(65) Prior Publication Data
US 2021/0319492 A1  Oct. 14, 2021

(30) Foreign Application Priority Data
Aug. 8, 2018  (KR) .................. 10-2018-0092650

(51) Int. Cl.
*G06Q 30/00* (2012.01)
*G06Q 30/0601* (2023.01)
(Continued)

(52) U.S. Cl.
CPC ..... *G06Q 30/0631* (2013.01); *G06F 16/3334* (2019.01); *G06F 16/3335* (2019.01);
(Continued)

(58) Field of Classification Search
CPC .......... G06Q 30/0631; G06Q 30/0627; G06Q 30/0643; G06F 16/3334; G06F 16/3335; G06V 10/44
See application file for complete search history.

(56) References Cited

U.S. PATENT DOCUMENTS 8,391,618 B1 * 3/2013 Chuang ................ G06V 30/274
382/224
10,607,082 B2 * 3/2020 Nowak-Przygodzki ......................
H04N 5/23293
(Continued)

FOREIGN PATENT DOCUMENTS

JP  2016-136410 A  7/2016
KR  10-2012-0019328 A  3/2012
(Continued)

OTHER PUBLICATIONS

Begelman, Grigory, Philipp Keller, and Frank Smadja. "Automated tag clustering: Improving search and exploration in the tag space." collaborative web tagging workshop at WWW/2006, Edinburgh, Scotland. (Year: 2006).*
(Continued)

*Primary Examiner* — Matthew E Zimmerman
(74) *Attorney, Agent, or Firm* — Cha & Reiter, LLC

(57) ABSTRACT

An electronic device according to various embodiments, may include a camera, a communication circuit, a display and a processor, and the processor may be configured to acquire an image of an external object, transmit the image to an external electronic device, so that the external electronic device transmits product information related to the external object included in the image to the electronic device, using the communication circuit, determine one or more keywords related to the product information transmitted from the external electronic device, identify preference category information and preference brand information of a user,
(Continued)

based on a usage record related to a product of the user related to the electronic device, determine weights for the one or more keywords, using the preference category information and the preference brand information, and provide at least some keywords having weights which satisfy a specified condition among the one or more keywords, on the display together with the product information.

12 Claims, 19 Drawing Sheets

(51) Int. Cl.
*G06F 16/33* (2019.01)
*G06V 10/44* (2022.01)

(52) U.S. Cl.
CPC ..... *G06Q 30/0627* (2013.01); *G06Q 30/0643* (2013.01); *G06V 10/44* (2022.01)

(56) References Cited

U.S. PATENT DOCUMENTS

| | | | | |
|---|---|---|---|---|
| 2007/0192294 | A1* | 8/2007 | Ramer | G06Q 30/02 |
| 2009/0125482 | A1* | 5/2009 | Peregrine | G06F 16/9038 |
| 2012/0047233 | A1 | 2/2012 | Jin | |
| 2012/0054635 | A1* | 3/2012 | Park | G06F 9/451 |
| | | | | 715/769 |
| 2016/0027051 | A1* | 1/2016 | Gross | G06Q 30/0276 |
| | | | | 705/14.54 |
| 2016/0078059 | A1 | 3/2016 | Kang et al. | |
| 2016/0283595 | A1* | 9/2016 | Folkens | G06F 3/017 |
| 2017/0301001 | A1 | 10/2017 | Wilkinson et al. | |
| 2019/0340669 | A1 | 11/2019 | Sugaya | |

FOREIGN PATENT DOCUMENTS

| | | |
|---|---|---|
| KR | 10-1315399 B1 | 10/2013 |
| KR | 10-1317401 B1 | 10/2013 |
| KR | 10-2015-0047146 A | 5/2015 |
| KR | 10-2016-0032937 A | 3/2016 |
| KR | 10-1666611 B1 | 10/2016 |
| KR | 10-2016-0130206 A | 11/2016 |
| KR | 10-1806169 B1 | 12/2017 |
| KR | 10-2018-0079762 A | 7/2018 |
| WO | 2018/066102 A1 | 12/2018 |

OTHER PUBLICATIONS

Office Action dated Nov. 15, 2022.

* cited by examiner

| shopping_product_info (311) |
|---|
| _id |
| product_id |
| product_name |
| product_brand |
| vendor_id |
| product_price |
| product_rating |
| is_selected_item |

| shopping_category_info (313) |
|---|
| _id |
| category_parent_id |
| category_depth |
| vendor_id |
| category_name |

FIG.3A

METHOD AND DEVICE FOR PROVIDING KEYWORDS RELATED TO PRODUCT INFORMATION INCLUDED IN IMAGE

CROSS REFERENCE TO RELATED APPLICATIONS

This application is a National Phase Entry of PCT International Application No. PCT/KR2019/007527, which was filed on Jun. 21, 2019, and claims a priority to Korean Patent Application No. 10-2018-0092650, which was filed on Aug. 8, 2018, the contents of which are incorporated herein by reference.

TECHNICAL FIELD

Various embodiments to be described relate to an electronic device for providing keywords related to product information included in an image.

BACKGROUND ART

An electronic device having a communication function is developed with development of technology. Such an electronic device may provide a search service using the communication function.

DISCLOSURE OF INVENTION

Technical Problem

If an electronic device provides a product search service through a dedicated application (e.g., bixby vision) or an image search function of a specific application, a keyword based on a user's shopping experience may not be exposed. Hence, a solution for providing the keyword based on the user's shopping experience may be required in the electronic device.

Technical problems to achieve in the this document are not limited to the technical problem mentioned above, and other technical problems not mentioned above may be clearly understood by those skilled in the technical field to which the present invention belongs from the following descriptions.

Solution to Problem

An electronic device according to various embodiments, may include a camera, a communication circuit, a display and a processor, and the processor may be configured to acquire an image of an external object, transmit the image to an external electronic device, so that the external electronic device transmits product information related to the external object included in the image to the electronic device, using the communication circuit, determine one or more keywords related to the product information transmitted from the external electronic device, identify preference category information and preference brand information of a user, based on a usage record related to a product of the user related to the electronic device, determine weights for the one or more keywords, using the preference category information and the preference brand information, and provide at least some keywords having weights which satisfy a specified condition among the one or more keywords, on the display together with the product information.

An electronic device according to various embodiments, may include a display, a memory for storing instructions, a camera, a communication circuit, and a processor functionally coupled with the display, the memory, the camera and the communication circuit, and the processor may be configured to, when executing the instructions, acquire an image including a visual object corresponding to an external object using the camera, acquire information of at least one product having a shape corresponding to a shape of the visual object, acquire at least one keyword for searching for at least one second product having a different shape distinguished from the shape of the visual object, based on a category of the at least one first product, and display information of the at least one keyword together with the at least one first product information using the display, based on acquiring the at least one keyword.

An electronic device according to various embodiments, may include a display, a memory for storing instructions, a camera, a communication circuit and a processor functionally coupled with the display, the memory, the camera and the communication circuit, and the processor may be configured to, when executing the instructions, acquire an image including a visual object corresponding to an external object using the camera, display keyword information for searching for a second product included in a category of a first product and having a different shape distinguished from a shape of the visual object together with first product information having a shape corresponding to the shape of the visual object using the display, based on acquiring recognition information of the visual object, and display the second product information using the display, based on receiving an input for the keyword.

Advantageous Effects of Invention

An electronic device according to various embodiments may provide keywords related to product information included in an image.

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

FIG. 3A is a diagram illustrating an example of a data configuration stored in an application interaction database according to various embodiments.

BEST MODE FOR CARRYING OUT THE INVENTION

Figure 1:
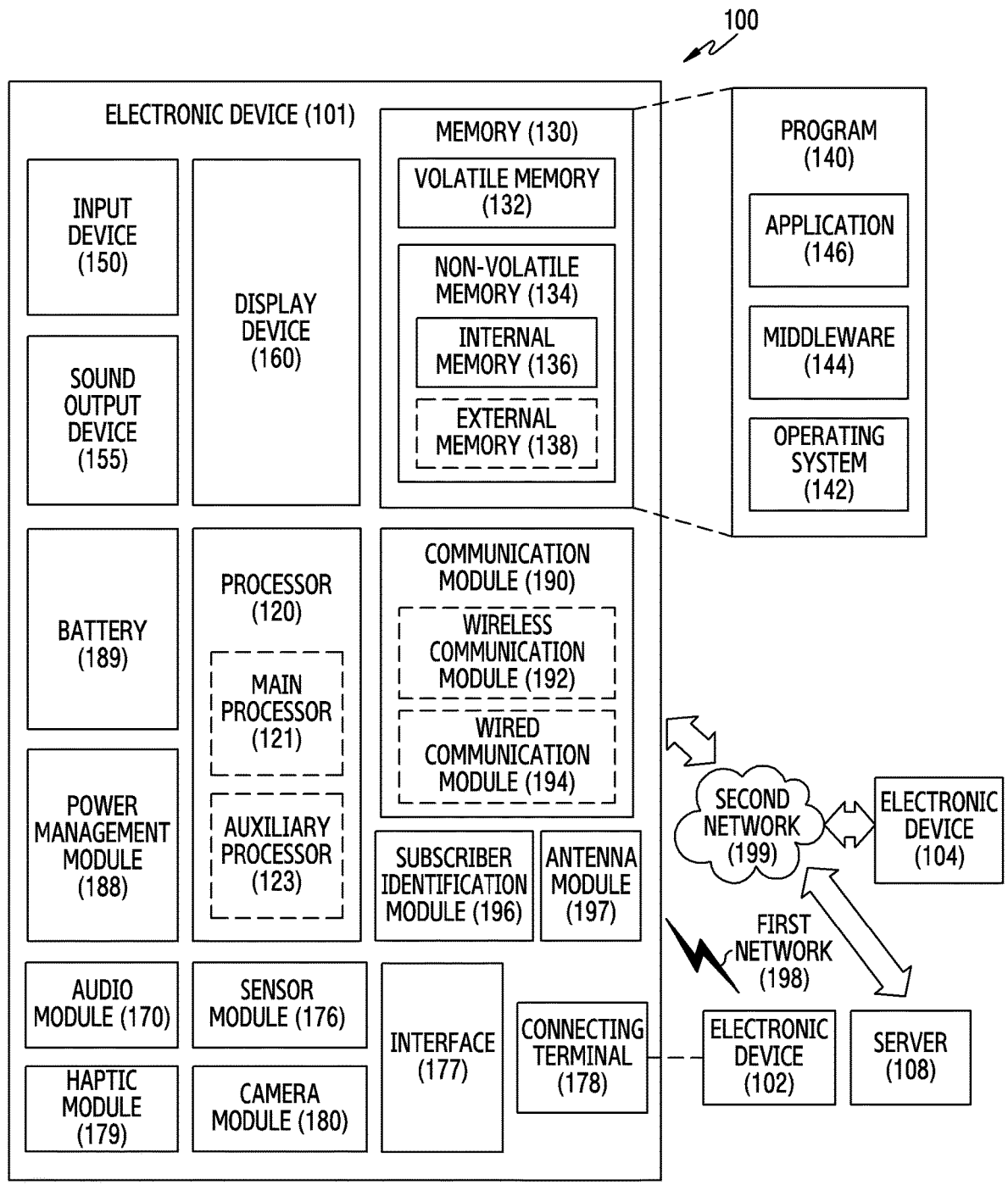
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
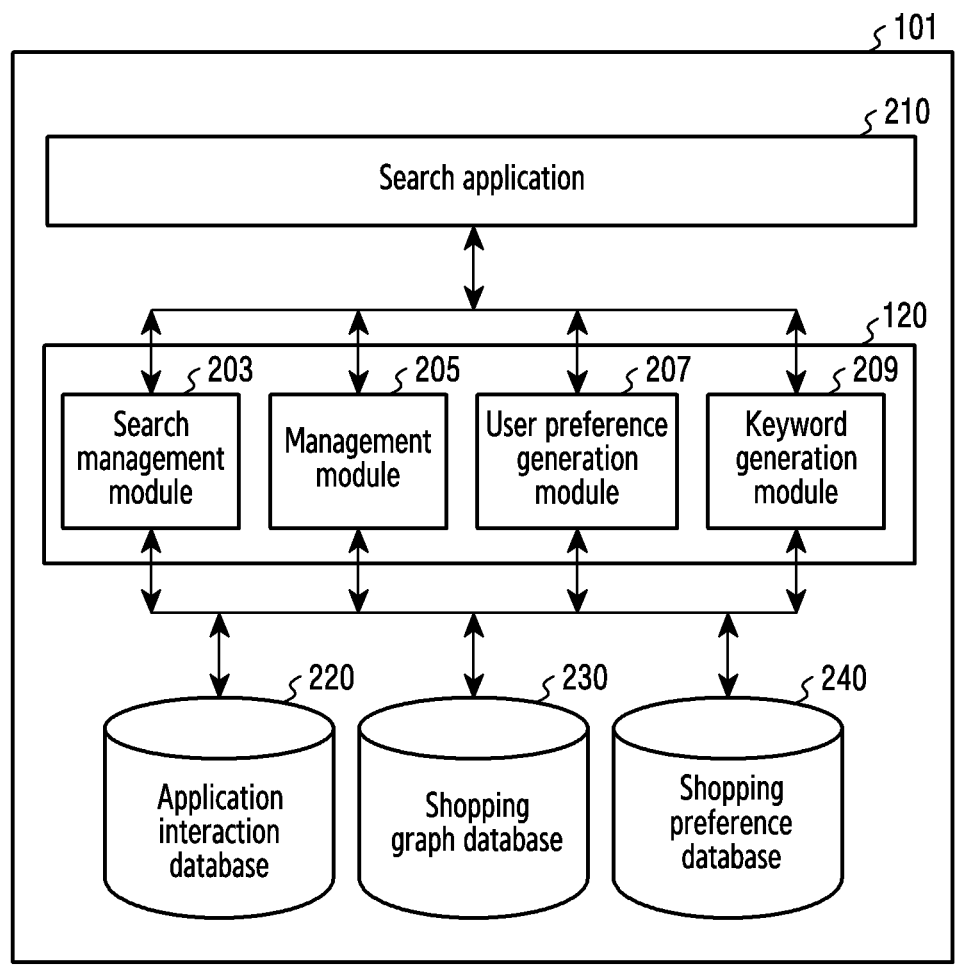
FIG. 2 illustrates an example of a functional configuration of an electronic device for providing keywords, according to various embodiments.

FIG. 2 illustrates an example of a functional configuration of an electronic device 101 for providing keywords, according to various embodiments. At least part of the functional configuration in FIG. 2, may be included in the electronic device 101 shown in FIG. 1.

Referring to FIG. 2, the electronic device 101 may include a search application 210, a processor 120, an application interaction database 220, a shopping graph database 230 or a shopping preference database 240. However, it is not limited thereto, and some component may be omitted.

According to an embodiment, the search application 210 may indicate an application for providing keywords based on user's shopping experience of the electronic device 101, in information search. For example, the search application 210 may request a search result from the server 108 based on a user's input, and provide information (e.g., the search result) received from the server 108 in a user interface. As another example, the search application 210 may perform the information search (e.g., product search) through text, and provide the searched information in the user interface. As another example, the search application 210 may provide information related to an object in a preview image in the user interface, based on the preview image received through the camera module 180 of the electronic device 101. As yet another example, the search application 210 may provide information related to an object in an image stored in the memory 130 of the electronic device 101 in the user interface. As still another example, the search application 210 may recognize a search request through a user's voice of the electronic device 101. The search application 210 may provide information corresponding to the search request in the user interface, based on the search request through the user's voice of the electronic device 101.

According to an embodiment, the processor 120 may include a search management module 203, an interaction management module 205, a user preference generation module 207 and a keyword generation module 209.

According to an embodiment, the search management module 203 may manage information of all the search data generated through the search application 210. The search management module 203 may manage at least one of a search service type (e.g., shopping), an image category (e.g., shoes) or a search result information history (e.g., a product name and a vendor).

According to an embodiment, the interaction management module 205 may collect information according to an operation conducted by the user in the search application 210. For example, if the user of the electronic device 101 browses the searched product information, the interaction management module 205 may match and store the product information and the user's operation (e.g., the operation of browsing the product information). As another example, if the user of the electronic device 101 stores the searched product in a wish list, the interaction management module 205 may match and store the product information and the user's operation (e.g., the operation for storing the searched product in the wish list). As yet another example, if the user of the electronic device 101 purchases the searched product, the interaction management module 205 may match and store the product information and the user's operation (e.g., the operation of purchasing the searched product). According to an embodiment, the interaction management module 205 may be in the form of an application programming interface (API).

According to an embodiment, the user preference generation module 207 may generate a graph indicating data relationships, based on the information according to the operation conducted by the user, collected through the interaction management module 205, and estimate user's preference. According to an embodiment, the user preference generation module 207 may update data in the shopping graph database 230. According to an embodiment, the user preference generation module 207 may update data in the shopping preference database 240.

According to an embodiment, the keyword generation module 209 may generate keywords to be provided to the search application 210. According to an embodiment, the keyword generation module 209 may analyze a product result and generate keywords based on the user's preference stored in the shopping preference database 240.

According to an embodiment, the application interaction database 220 may store the data generated through the interaction management module 205. FIG. 3A is a diagram illustrating an example of a data configuration stored in the application interaction database 220 according to various embodiments. Referring to FIG. 3A, shopping product data or shopping category data may be stored in the application interaction database 220. The shopping product data may be stored in the form of a shopping product data configuration 311. The shopping category data may be stored in the form of a shopping category data configuration 313. According to an embodiment, the shopping product data configuration 311 may include an ID, a product ID, a product name, a product brand, a product provider ID, a product price, a product rating, or product selection information. According to an embodiment, the shopping category data configuration 313 may include an ID, a higher category ID, a category depth, a product provider ID or a category name.

Figure 3B:
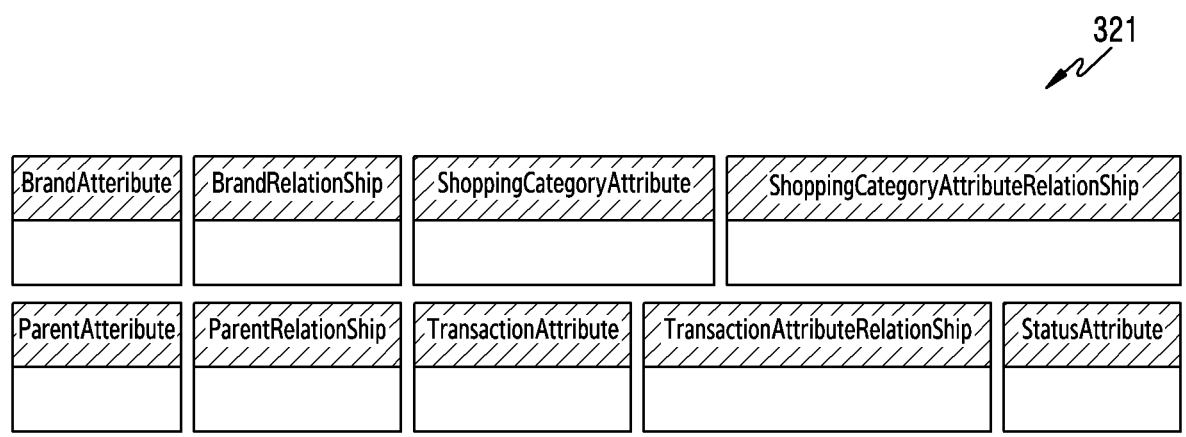
FIG. 3B is a diagram illustrating an example of a data configuration stored in a shopping graph database according to various embodiments.

According to an embodiment, the shopping graph database 230 may store information required for generating the shopping graph. The shopping graph database 230 may be updated with data through the user preference generation module 207. FIG. 3B is a diagram illustrating an example of the data configuration stored in the shopping graph database 230 according to various embodiments. Referring to FIG. 3B, the shopping graph data may be stored in the shopping graph database 230. The shopping graph data may be stored in the form of a shopping graph data configuration 321. The shopping graph data configuration may include information relating to a brand, a brand relationship, a shopping category, a relationship of shopping categories, a higher category, a relationship of higher categories, transaction information, relationship of transaction information, or current status information.

Figure 3C:
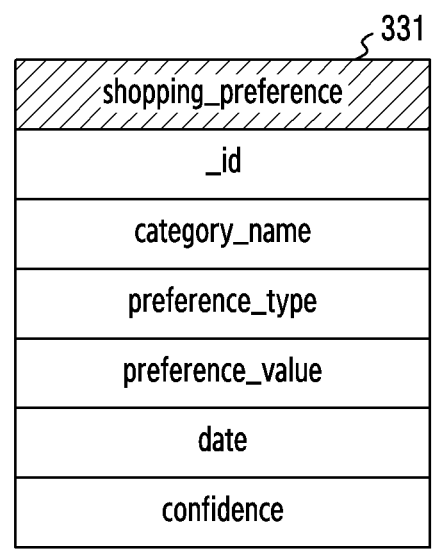
FIG. 3C is a diagram illustrating an example of a data configuration stored in a shopping preference database according to various embodiments.

According to an embodiment, the shopping preference database 240 may store data relating to the user's shopping preferences. The shopping preference database 240 may store data relating to a brand, a category, a price or a shopping tendency preferred by the user. FIG. 3C is a diagram illustrating an example of the data configuration stored in the shopping preference database 240 according to various embodiments. Referring to FIG. 3C, data relating to the user's shopping preference may be stored in the form of a shopping preference data configuration 331. The shopping preference data configuration 331 may include an ID, a category name, a preference type, a preference value, a date or a confidence.

The components in the electronic device 101 shown in FIG. 2 may be used to implement operations of the electronic device 101 to be described with reference to FIG. 4A through FIG. 17. According to the design of the electronic device 101 according to various embodiments, at least some of the components of the electronic device 101 in FIG. 2 may be integrated or omitted. Also, according to the design of the electronic device 101 according to various embodiments, other configuration than the configurations of the electronic device 101 in FIG. 2 may be used in the electronic device 101.

As described above, an electronic device (e.g., the electronic device 101) according to various embodiments may include a camera (e.g., the camera module 180), a communication circuit (e.g., the communication module 190), and a display (e.g., the display device 160) and a processor (e.g., the processor 120), wherein the processor may be configured to acquire an image of an external object by using the camera, transmit the image to an external electronic device, using the communication circuit, so that the external electronic device (e.g., the server 108) transmits product information related to the external object included in the image to the electronic device, determine one or more keywords related to the product information transmitted from the external electronic device, identify preference category information and preference brand information of the user, based on a use record related to a product of the user related to the electronic device, determine a weight for the one or more key words, using the preference category information and the preference brand information, and provide at least some keyword having a weight satisfying a designated condition among the one or more keywords, together with the product information, on the display.

In various embodiments, the processor may be configured further to, based on a user input received with at least one keyword of the at least some keywords, provide other product information searched using the one keyword for which the input is received.

In various embodiments, the processor may be configured further to remove a stop word from the product information transmitted from the external electronic device.

In various embodiments, the processor may be configured to remove the stop word from the product information transmitted from the external electronic device, based on a predesignated stop word list or stop word processing condition.

In various embodiments, the processor may be configured to differently display and provide an object representing the at least some keyword together with the product information, on the display, based on the preference category information or the preference brand information.

In various embodiments, the processor may be configured to provide at least some keywords exceeding a predesignated weight or at least some keywords having a predesignated number according to a weight magnitude among the one or more keywords, through the display.

In various embodiments, the processor may be configured further to update the preference category information and the preference brand information of the user, based on the product information transmitted from the external electronic device.

As described above, the electronic device (e.g., the electronic device 101) according to various embodiments may include a display (e.g., the display device 160), a memory (e.g., the memory 130) for storing instructions, a camera (e.g., the camera module 180), a communication circuit (e.g., the communication module 190), and a processor (e.g., processor 120) operatively coupled with the display, the memory, the camera, and the communication circuitry, and the processor may be configured to, when executing the instructions, obtain an image including a visual object corresponding to an external object using the camera, obtain information of at least one first product having a shape corresponding to a shape of the visual object based on recognition information of the visual object, based on a category of the at least one first product, obtain at least one keyword for searching for at least one second product having a different shape distinguished from the shape of the visual object, and based on obtaining the at least one keyword, display information of the at least one keyword together with the at least one first product information using the display.

In various embodiments, the processor may, when executing the instructions, be configured to transmit an image including a visual object corresponding to the external object to an external electronic device, and receive at least one first product information having a shape corresponding to the shape of the visual object from the external electronic device.

In various embodiments, the processor may, when executing the instructions, be configured to identify a category of the at least one first product, and obtain at least one keyword for searching for the at least one second product different from the identified category.

In various embodiments, the processor may, when executing the instructions, be configured to identify a category of the at least one first product, and obtain at least one keyword for searching for the at least one second product which is the same as the identified category.

In various embodiments, the at least one keyword may include a preference brand keyword, a general brand keyword, a category keyword, a shopping tendency keyword, or a preference price search keyword.

As described above, an electronic device (e.g., the electronic device 101) according to various embodiments may include a display (e.g., the display device 160), a memory (e.g., the memory 130) for storing instructions, a camera (e.g., the camera module 180), a communication circuit (e.g., the communication module 190), and a processor (e.g., the processor 120) functionally coupled with the display, the memory, the camera, and the communication circuitry, and the processor may be configured to, when executing the instructions, acquire an image including a visual object corresponding to an external object using the camera, based on acquiring recognition information of the visual object, display keyword information for searching for a second product included in a category of the first product and having a different shape distinguished from a shape of the visual object together with information of a first product having a shape corresponding to the shape of the visual object using the display, and based on receiving an input for the keyword, display the second product information using the display.

In various embodiments, the keyword information may include the keyword or a shape of an object corresponding to the keyword.

In various embodiments, the processor may, when the instructions are executed, be configured to display the second product information in the form of a list using the display.

In various embodiments, the first product information or the second product information may include at least one of brand name information, vendor information, and price information.

In various embodiments, the shape of the visual object may include at least one of a shape, a size, a color, and a style of the visual object.

In various embodiments, the processor may, when executing the instructions, be configured to display the keyword information for searching for the second product included in the category of the first product and having the different shape distinguished from the shape of the visual object together in a first area of a user interface, and display the first product information having the shape corresponding to the shape of the visual object in a second area of the user interface.

In various embodiments, the processor may, when executing the instructions, be configured to display the second product information together with some of the first product information in the user interface using the display.

In various embodiments, the processor may, when executing the instructions, be configured to display the keyword information together with the first product information by partially overlapping the image.

Figure 4A:
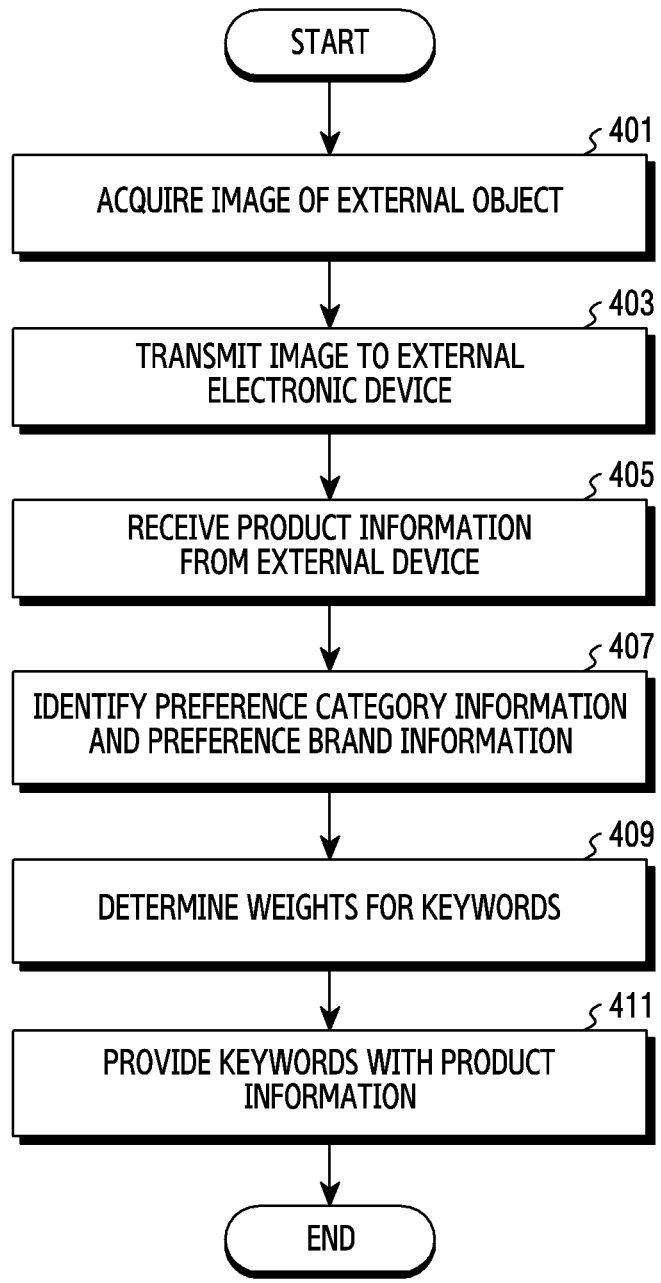
FIG. 4A illustrates an example of operations of an electronic device according to various embodiments.

FIG. 4A illustrates an example of operations of an electronic device 101 according to various embodiments. Such operations may be fulfilled by the electronic device 101 shown in FIG. 1, the electronic device 101 shown in FIG. 2, or the processor 120 of the electronic device 101.

Figure 5:
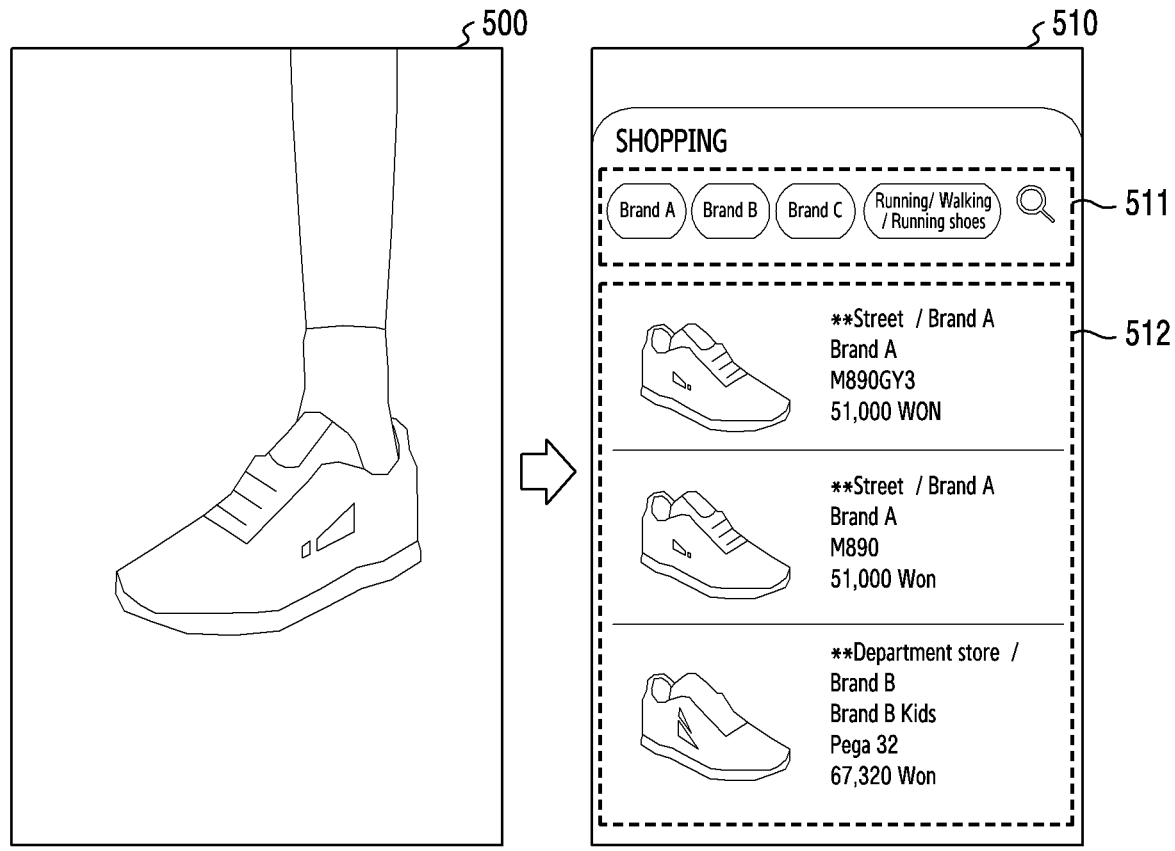
FIG. 5 illustrates an example of an operation for performing image search in an electronic device according to various embodiments.

FIG. 5 illustrates an example of operations for performing image search in an electronic device 101 according to various embodiments.

Figure 6:
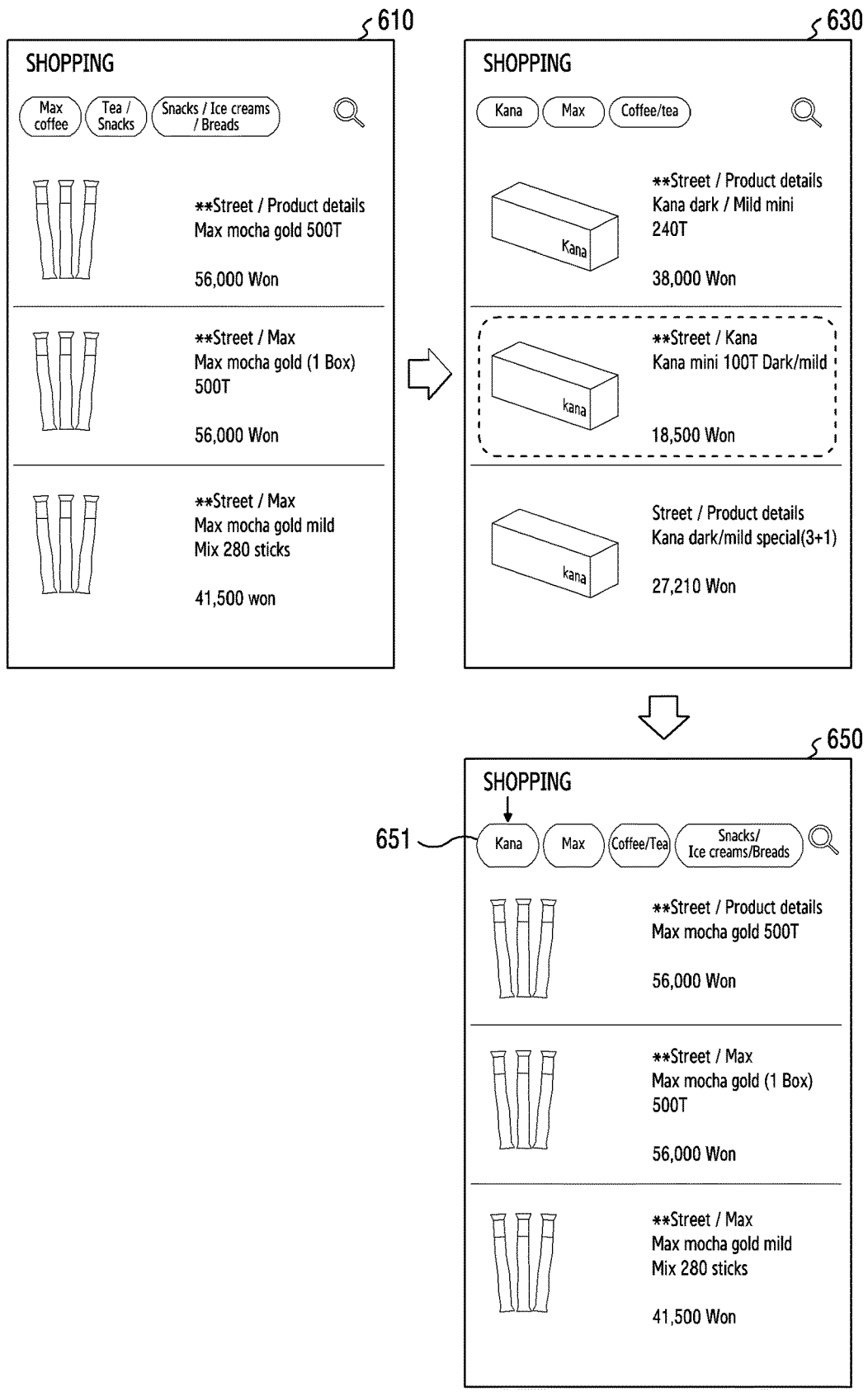
FIG. 6 illustrates an example of operations for providing keywords together with product information in an electronic device according to various embodiments.

FIG. 6 illustrates an example of operations for providing keywords together with product information in an electronic device 101 according to various embodiments.

Referring to FIG. 4A, in operation 401, the processor 120 of the electronic device 101 may acquire an image of an external object using the camera module 180 of the electronic device 101. According to an embodiment, the processor 120 may acquire the image of the external object by using the camera module 180 in a user interface of the search application 210. Referring to FIG. 5, the processor 120 may acquire an image of a product (e.g., shoes) which the user of the electronic device 101 wants to search for by using the camera module 180. The processor 120 may display the image of the product which the user of the electronic device 101 wants to search for through a user interface 500. According to an embodiment, the processor 120 may acquire an image including a plurality of external objects.

In operation 403, the processor 120 may transmit the image to an external electronic device (e.g., the server 108). According to an embodiment, the processor 120 may transmit the acquired image to the external electronic device, to transmit product information related to the external object from the external electronic device to the electronic device 101 through the communication module 190 of the electronic device 101. According to an embodiment, the external electronic device may analyze the image received from the electronic device 101 and transmit product information related to the external object to the electronic device 101.

According to an embodiment, the processor 120 may analyze the acquired image. The processor 120 may identify at least one of a color, a size, a text, and a shape of the object included in the acquired image. The processor 120 may identify information (e.g., a category, a brand) of the object included in the acquired image. The processor 120 may transmit the acquired image together with the object information to the external electronic device (e.g., the server 108). For example, the processor 120 may acquire the image of the external object. The processor 120 may identify that the external object corresponds to the shoes. The processor 120 may transmit information indicating that the object included in the acquired image is the shoes together with the acquired image to the external electronic device.

In operation 405, the processor 120 may receive the product information related to the external object from the external electronic device (e.g., the server 108). According to an embodiment, the external electronic device may identify information (e.g., the category, the brand) of the object included in the image. The external electronic device may obtain the product information related to the external object based on the object information included in the image. The external electronic device may transmit the product information related to the external object to the electronic device 101. The processor 120 of the electronic device 101 may receive the product information related to the external object from the external electronic device. According to an embodiment, the external electronic device may indicate a server used to acquire the product information related to the external object. According to an embodiment, the server 108 may be configured with a single server, or with a plurality of different servers. According to an embodiment, if there is a plurality of external objects, the processor 120 may receive product information of a plurality of products related to the plurality of the external objects.

In operation 407, the processor 120 may identify user's preference category information and preference brand information based on the usage record related to the product of the user of the electronic device 101. According to an embodiment, the processor 120 may identify the usage record related to the user's product stored in the application interaction database 220. For example, if the external object corresponds to shoes and product information related to the shoes is received, the processor 120 may identify a usage record related to the user's shoes (e.g., a user's search record for the shoes, a user's record for adding the shoes to the wish list or a user's record for purchasing the shoes). According to an embodiment, the processor 120 may identify the user's preference category information and preference brand information stored in the shopping preference database 240. For example, the processor 120 may identify that the user of the electronic device 101 prefers sneakers among the shoes, based on the usage record related to the user's product. The processor 120 may identify that the user of the electronic device 101 prefers a brand A, based on the usage record related to the use's product.

In operation 409, the processor 120 may determine weights for the one or more keywords using the preference category information and the preference brand information. According to an embodiment, the processor 120 may determine confidence (preference) of the preferred product based on the preference category information and the preference brand information. The processor 120 may determine scores of one or more brands based on the received product information. The processor 120 may determine the weights for the one or more keywords through the confidence determined based on the preference category information and the preference brand information and the one or more brand scores determined based on the received product information. For example, the processor 120 may determine the confidence (e.g., 0.7) of the brand A and the confidence (e.g., 0.2) of a brand B based on the preference category information and the preference brand information. The processor 120 may determine the score (e.g., 1.5) of the brand A and the score (0.25) of the brand B based on the received product information. The processor 120 may determine final weights by combining some of the confidences determined based on the preference category information and the preference brand information and some of the scores determined based on the received product information. The processor 120 may determine the final weight (e.g., 1.17) of the brand A and the final weight (e.g., 0.68) of the brand B.

In operation 411, the processor 120 may provide at least some keywords having the weight which satisfies a designated condition among the one or more keywords together with the product information. According to an embodiment, the processor 120 may determine a designated number of keywords having the great weight as at least some keywords. The processor 120 may provide the at least some keywords determined together with the product information. According to an embodiment, the processor 120 may determine at least some keywords exceeding a designated weight among the one or more keywords. For example, if the final weight (e.g., 1.17) of the brand A is equal to or greater than the designated weight (e.g., 1), the processor 120 may display the brand A as the keyword to display on the display device 160 of the electronic device 101. If the final weight (e.g., 0.68) of the brand B is less than the designated weight (e.g., 1), the processor 120 may exclude the brand B from the keyword to display on the display device 160 of the electronic device 101. According to an embodiment, as shown in FIG. 5, the processor 120 may provide at least some keywords along with the product information through a user interface 510. The processor 120 may display at least some keywords in a first area 511 of the user interface 510. The processor 120 may display the product information in a second area 512 of the user interface 510.

According to an embodiment, at least some keywords may include a preference brand keyword, a general brand keyword, a category keyword, a shopping tendency keyword or a preference price search keyword. According to an embodiment, the processor 120 may display the product information in the second area 512 in ascending order of similarity, based at least on the brand, the color, the size or the style of the object included in the acquired image. For example, if the object included in the acquired image corresponds to the shoes, shoes having the most similar brand, color, size, or style of the shoes may be displayed on the top of the second area 512. The processor 120 may display shoes having a lower similarity than the object included in the acquired image at the bottom of the second area 512. FIG. 6 illustrates an example of screens displayed in the electronic device 101 according to various embodiments. Referring to FIG. 6, the processor 120 may receive product information of a product (e.g., a MAX coffee mix) included in an image. If the processor 120 has no search history for a category (e.g., the coffee) of the product included in the image, the processor 120 may display the first brand (e.g., MAX) of the product included in the image as the keyword in a user interface 610. The processor 120 may store the keyword indicating the first brand (e.g., MAX) of the product included in the image in the shopping preference database 240.

According to an embodiment, the processor 120 may receive product information of another product (e.g., a KANA coffee mix) included in another image. The processor 120 may identify a search history of a category (e.g., the coffee) of the another product included in the another image. The processor 120 may identify the search history of the user of the electronic device 101 for the first brand (e.g., MAX). The processor 120 may display the second brand (e.g., KANA) of the another product and the first brand (e.g., MAX) as the keywords in a user interface 630 together with the product information of the another product. If the user purchases the product of the second brand, the processor 120 may store the second brand as the keyword in the shopping preference database 240.

According to an embodiment, the processor 120 may receive product information of the product (e.g., the coffee mix) of the first brand (e.g., MAX) included in the image. The processor 120 may identify a purchase or search history of the category (e.g., the coffee) of the product of the first brand included in the image. The processor 120 may identify the purchase history of the user of the electronic device 101 for the second brand (e.g., KANA). The processor 120 may identify that the second brand is the user's preference brand in the category of the product of the first brand included in the image. The processor 120 may display the second brand as the keyword in a user interface 650 together with the product information of the first brand included in the image.

Figure 4B:
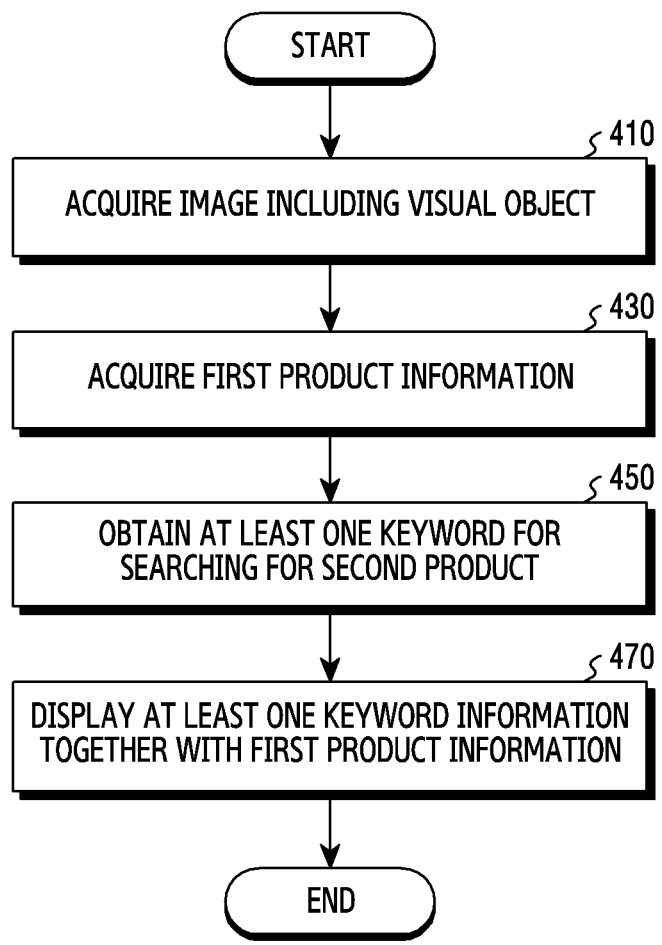
FIG. 4B illustrates another example of operations of the electronic device according to various embodiments.

FIG. 4B illustrates another example of operations of the electronic device 101 according to various embodiments. Such operations may be fulfilled by the electronic device 101 shown in FIG. 1, the electronic device 101 shown in FIG. 2, or the processor 120 of the electronic device 101.

Referring to FIG. 4B, in operation 410, the processor 120 may acquire an image including a visual object corresponding to an external object by use of the camera module 180 of the electronic device 101. According to an embodiment, the image including the visual object corresponding to the external object may correspond to a captured image or a preview image acquired using the camera module 180 of the electronic device 101. According to an embodiment, the external object may include a product, a text, or a brand logo near the electronic device 101.

In operation 430, the processor 120 may acquire information of at least one first product, based on recognition information of the visual object. The at least one first product may have a shape corresponding to a shape of the visual object. According to an embodiment, the processor 120 may identify the recognition information of the visual object included in the image. According to an embodiment, the recognition information of the visual object may include information of at least one feature point of the visual object. For example, if the visual object corresponds to a shoe, the processor 120 may extract feature points of the shoe. The processor 120 may identify at least one of a brand, a size, a color or a design of the shoe, using the feature points of the shoe. According to an embodiment, the processor 120 may obtain product list information of a product having a shape similar to the shape of the visual object. The product list information may include at least one information of product name information, vendor information or price information.

According to an embodiment, the processor 120 may request information of the first product from the server 108, based on the recognition information of the visual object. The server 108 may receive the information request for the first product from the electronic device 101, and transmit the first product information to the electronic device 101. The processor 120 may receive the first product information from the server 108. According to an embodiment, the server 108 may indicate a server used to acquire the recognition information of the visual object. According to an embodiment, the server 108 may indicate a server used to obtain the first product information. According to an embodiment, the server 108 may be configured with a single server, or with a plurality of different servers.

In operation 450, the processor 120 may obtain at least one keyword for searching for at least one second product, based on a category of the at least one first product. According to an embodiment, the at least one second product may have a different shape which is distinguished from the shape of the visual object. In addition, the at least one keyword for searching for the at least one second product may mean a brand name of the second product. According to an embodiment, the at least one second product having the different shape distinguished from the shape of the visual object may indicate a product having the different shape from the shape of the visual object in the color, the form, the size, or the brand. According to an embodiment, the processor 120 may obtain at least one keyword for searching for at least one second product, based on the user's preference. According to an embodiment, the processor 120 may identify the preference category information and the preference brand information based on the usage record of the user of the electronic device 101. The processor 120 may determine a weight for the preference brand (keyword) by using the preference category information and the preference brand information. According to an embodiment, the processor 120 may obtain at least one keyword for searching for at least one second product, based on the weight. According to an embodiment, the processor 120 may determine a keyword over a specific weight as the at least one keyword for searching for the at least one second product. According to an embodiment, the processor 120 may determine a predetermined number of keywords as at least one keyword for searching for the at least one second product according to the weight size order.

In operation 470, based on obtaining the at least one keyword, the processor 120 may display the information of the at least one keyword together with the information of the at least one first product on the display device 160 of the electronic device 101. According to an embodiment, the at least one keyword information may include the keyword or an object shape corresponding to the keyword. For example, if the keyword is the brand A, the at least one keyword information may include a keyword representing the brand A, a logo of the brand A, and a product shape of the brand A. According to an embodiment, the processor 120 may display the at least one keyword information together with the at least one first product information through a user interface of the search application 210.

Figure 7:
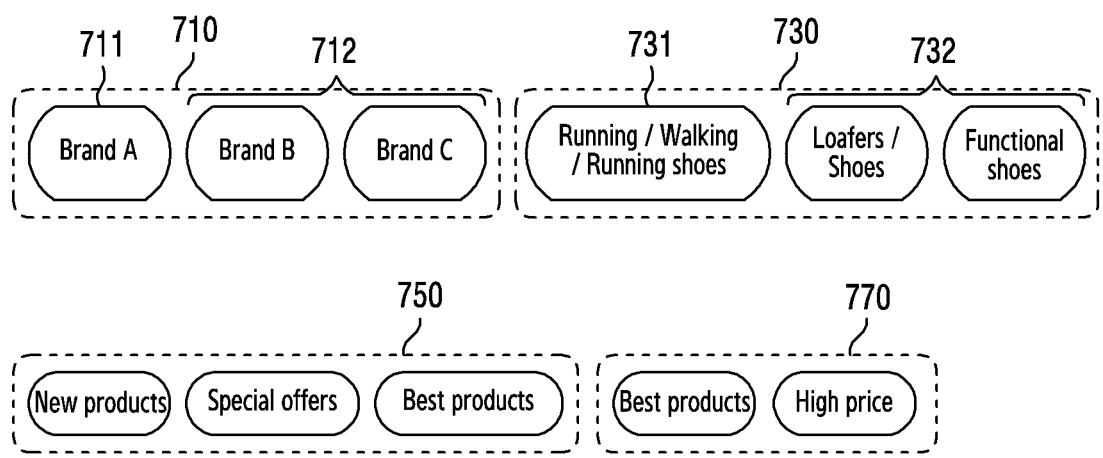
FIG. 7 illustrates an example of a configuration for displaying keywords in an electronic device according to various embodiments.

FIG. 7 illustrates an example of a configuration for displaying keywords in an electronic device 101 according to various embodiments.

Referring to FIG. 7, keywords displayed through the electronic device 101 may include brand keywords 710, category keywords 730, shopping tendency keywords 750 or preference price search keywords 770. According to an embodiment, the processor 120 may display the keywords in order of the brand keywords 710, the category keywords 730, the shopping tendency keywords 750, and the preference price search keywords 770.

According to an embodiment, the processor 120 may display a keyword for searching for an additional product based on a user's preference on the display device 160 of the electronic device 101. According to an embodiment, the processor 120 may display a keyword for classifying the searched product information through the display device 160.

According to an embodiment, the brand keywords 710 may include a preference brand keyword 711 or a general brand keyword 712. The preference brand keyword 711 may be determined based on the user's shopping preference data stored in the shopping preference database 240. According to an embodiment, the preference brand keyword 711 may be set differently for each category. For example, the preference brand keyword 711 in a bag category may be differently set to A, and the preference brand keyword 711 in a shoes category may be differently set to B. According to an embodiment, the preference brand keyword 711 may not be displayed if there is no preference brand.

According to an embodiment, if the processor 120 receives an input for the preference brand keyword 711 from the user, the processor 120 may additionally display product information related to a brand corresponding to the preference brand keyword 711 together with the searched product information. For example, if the processor 120 receives an input for the preference brand keyword 711 from the user, the processor 120 may receive product information related to a brand corresponding to the inputted preference brand keyword 711 from the external electronic device (e.g., the server 108). The processor 120 may display the product information related to the brand together with the searched product information. According to an embodiment, if the processor 120 receives an input for the preference brand keyword 711 from the user, the processor 120 may filter with the brand corresponding to the preference brand keyword 711 in the searched product information and thus display only products of the brand corresponding to the preference brand keyword 711.

According to an embodiment, the general brand keyword 712 may indicate a brand of the same category as the preference brand keyword 711. According to an embodiment, the general brand keyword 712 may be included in the searched product information, but may indicate other brand than the preference brand. According to an embodiment, the brand keyword 710 may be stored in the shopping preference database 240 together with its preference per brand. According to an embodiment, if the processor 120 receives an input for the general brand keyword 712, the processor 120 may filtering the searched product information with a brand corresponding to the selected general brand keyword 712 and thus display only products of the brand corresponding to the general brand keyword 712 selected.

According to an embodiment, the category keywords 730 may include a preference category keyword 731 or a general category keyword 732. The preference category keyword 731 may be determined based on the user's shopping preference data stored in the shopping preference database 240. For example, if the user of the electronic device 101 searches for shoes, the processor 120 may display running/walking/running shoes category keywords as the preference category keyword 731 based on the shopping preference (shopping history) of the user. According to an embodiment, the category keywords 730 may be set differently according to the depth of the category. For example, the highest category keyword may be a fashion category keyword. The fashion category keyword may include a shoes category keyword, a hat category keyword or a pants category keyword. The shoes category keyword may include a running/walking/running shoes category, a loafers/shoes category or a functional shoes category. According to an embodiment, the category keywords 730 may be stored in the shopping preference database 240 together with the preference of each category. According to an embodiment, if the processor 120 receives an input for the category keywords 730, the processor 120 may filter the searched product information with a category corresponding to the selected category keywords 730, and thus display only products of the category corresponding to the selected category keyword 730.

According to an embodiment, the shopping tendency keyword 750 may include keywords according to the user's shopping tendency. For example, the shopping tendency keywords 750 may include a new product keyword, a discount special price keyword or a best product keyword. According to an embodiment, if the processor 120 receives an input for the shopping tendency keywords 750, the processor 120 may filter the searched product information with a condition corresponding to the selected shopping tendency keywords 750, and thus display only products of the condition corresponding to the selected shopping tendency keywords 750.

According to an embodiment, the preference price search keywords 770 may indicate keywords for sorting the product information in ascending order or descending order of the price. For example, the preference price search keyword 770 may include a low price keyword or a high price keyword. The low price keyword may correspond to a keyword for sorting the product information in ascending order of the price. The high price keyword may correspond to a keyword for sorting the product information in descending order of the price. According to an embodiment, if the processor 120 receives an input for the preference price search keywords 770, the processor 120 may rearrange the searched product information in the order corresponding to the selected preference price search keywords 770 and thus display the searched product information.

Figure 8:
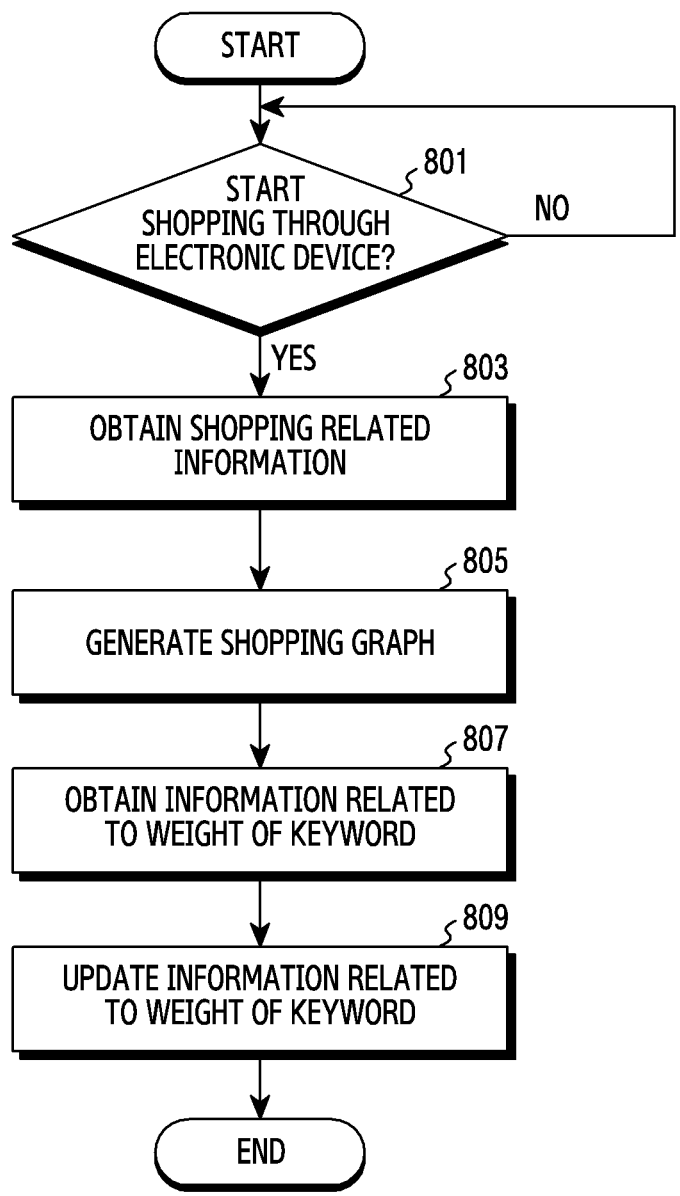
FIG. 8 illustrates an example of operations of an electronic device for updating information related to a keyword weight according to various embodiments.
Figure 9:
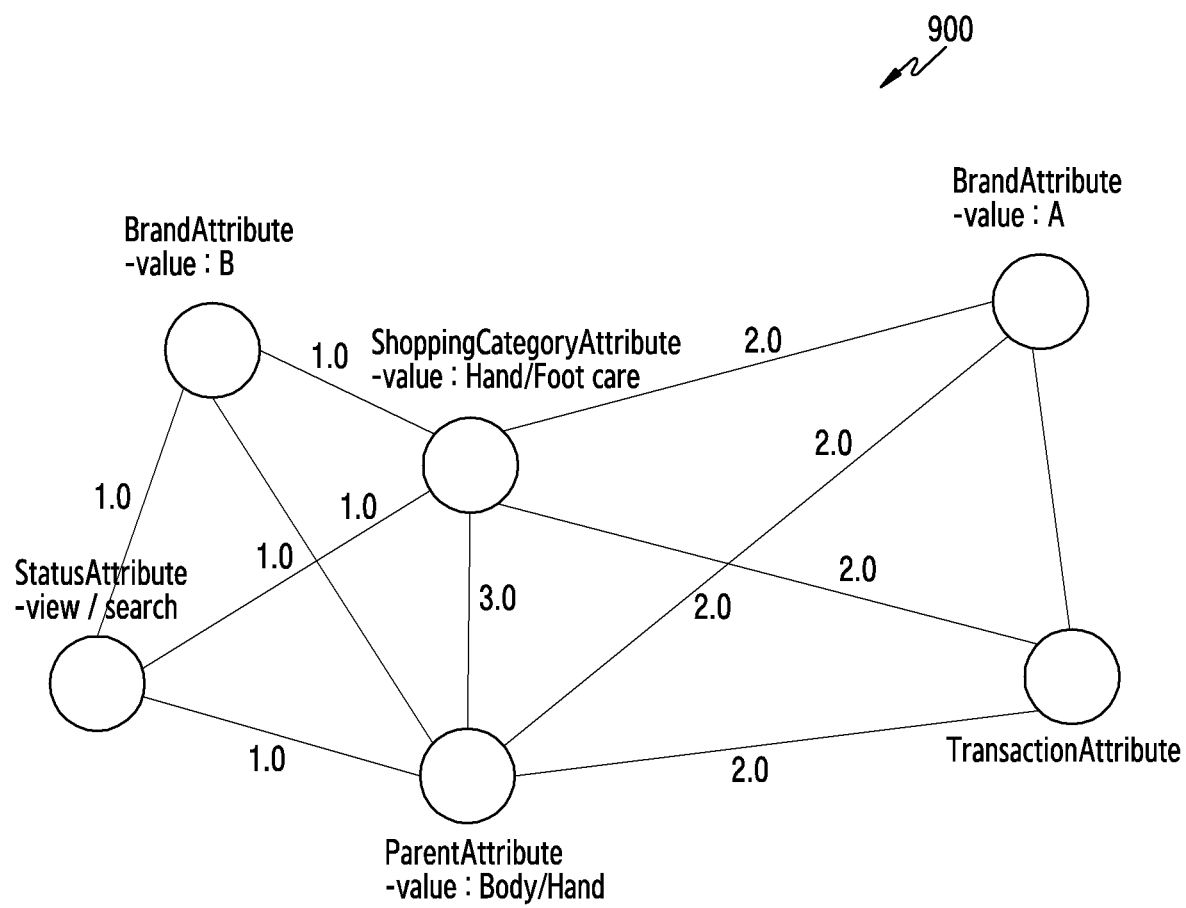
FIG. 9 illustrates an example of a shopping graph according to various embodiments.

FIG. 8 illustrates an example of operations of an electronic device 101 for updating information related to a keyword weight according to various embodiments. FIG. 9 illustrates an example of a shopping graph according to various embodiments.

Referring to FIG. 8, in operation 801, the processor 120 may identify whether the user of the electronic device 101 starts shopping through the electronic device 101. According to an embodiment, the processor 120 may identify whether the search application 210 is executed. According to an embodiment, by identifying whether the search application 210 is executed, the processor 120 may identify whether the user of the electronic device 101 starts shopping through the electronic device 101. According to an embodiment, the processor 120 may identify whether the user of the electronic device 101 starts shopping through the electronic device 101, by identifying whether an input for the product search is received from the user of the electronic device 101 through the search application 210.

In operation 803, the processor 120 may obtain shopping related information. According to an embodiment, the processor 120 may collect information according to an operation performed by the user. For example, if the user of the electronic device 101 browses the searched product information, the processor 120 may match the product information with the user's operation (e.g., the operation of browsing the product information) and store in the application interaction database 220. As another example, if the user of the electronic device 101 stores the searched product in the wish list, the processor 120 may match and store the product information and the user's operation (e.g., the operation of storing the searched product in the wish list) in the application interaction database 220. As yet another example, if the user of the electronic device 101 purchases the searched product, the processor 120 may match and store the product information and the user's operation (e.g., the operation of purchasing the searched product) in the application interaction database 220.

In operation 805, the processor 120 may generate a shopping graph. According to an embodiment, the processor 120 may generate a shopping graph using the information stored in the shopping graph database 230 or the application interaction database 220. According to an embodiment, the processor 120 may generate based on a category, a brand, and a transaction history of the product. For example, the processor 120 may identify the category of the product searched by the user through the obtained shopping related information. The processor 120 may generate the shopping graph based on the brand or the transaction history related to the category of the product searched by the user. Referring to FIG. 9, the processor 120 may generate a graph 900 based on the shopping graph database 230. The graph 900 may indicate relationships of category, brand, and transaction history information. For example, if the user purchases an A brand hand cream, the weights of the relationships between the brand A, a hand/foot care category, a body/hand category which is a higher category of the hand/foot care category, and the purchase attribute may increase. In the graph 900, the user purchased the brand A's hand cream two times, and searched for the brand B's hand cream one time. According to an embodiment, the graph 900 corresponds to an example generated only with the information according to the search and information according to the transaction, and the graph 900 may be generated according to various information and categories.

In operation 807, the processor 120 may obtain information related to the weight of the keyword. According to an embodiment, the processor 120 may obtain the weight information (e.g., confidence) of the keyword based on the shopping graph. For example, if the category of the product searched by the user corresponds to the hand cream, the processor 120 may identify through the graph 900 that the user purchased the brand A's hand cream twice and searched for the brand B's hand cream once. The processor 120 may identify that the user prefers the brand A's hand cream. The processor 120 may identify that the weight of the keyword indicating the brand A is set higher than the weight of the keyword indicating the brand B.

In operation 809, the processor 120 may update the acquired keyword weight information. According to an embodiment, the processor 120 may update the keyword weight information based on the shopping related information. For example, if the product searched by the user corresponds to the hand cream of the brand B, the processor 120 may update the graph 900 with two searches of the hand cream of the brand B. The processor 120 may re-identify (update) the weight information of the keyword indicating the brand A and the keyword indicating the brand B based on the updated information. The processor 120 may update and store the updated information in the shopping preference database 240.

Figure 10:
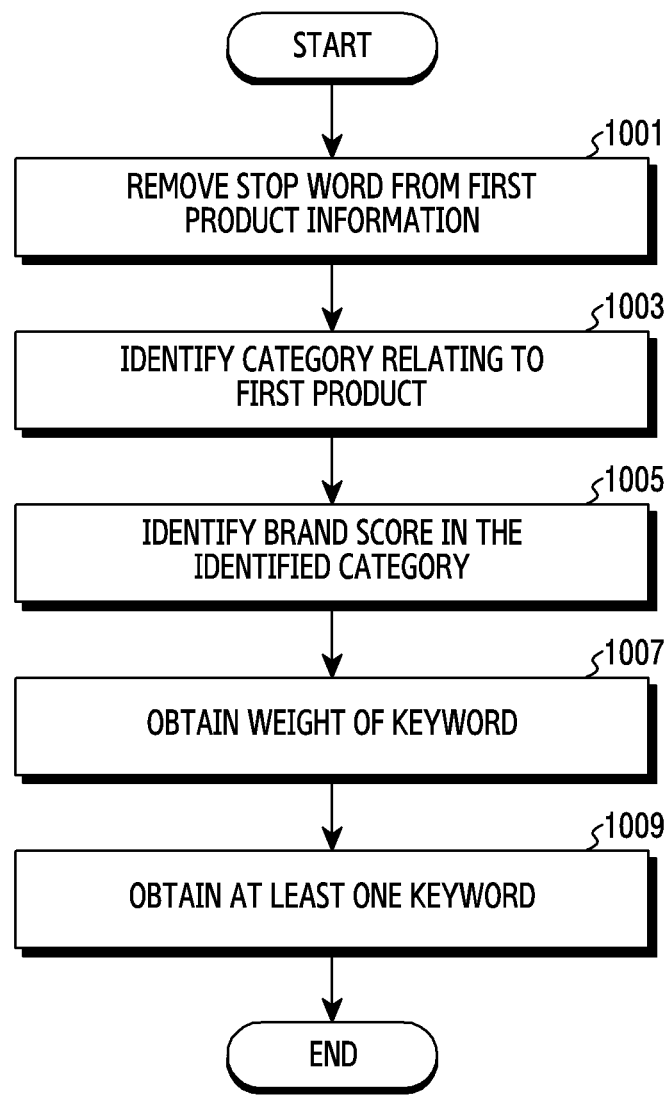
FIG. 10 illustrates an example of operations of an electronic device for acquiring at least one keyword according to various embodiments.

FIG. 10 illustrates an example of operations of an electronic device 101 for acquiring at least one keyword according to various embodiments. Such operations may be performed by the electronic device 101 shown in FIG. 1, the electronic device 101 shown in FIG. 2, or the processor 120 of the electronic device 101. Operations 1001 through 1007 of FIG. 10 may be related to operation 450 of FIG. 4B.

Figure 11:
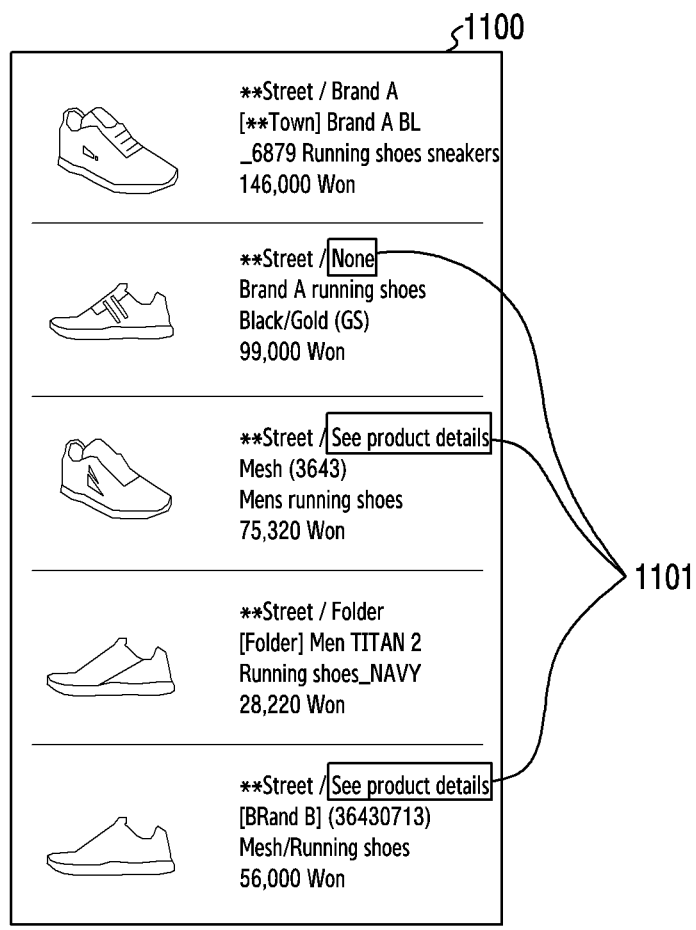
FIG. 11 illustrates an example of stop words in product information according to various embodiments.

FIG. 11 illustrates an example of stop words in product information according to various embodiments.

Referring to FIG. 10, in operation 1001, the processor 120 may remove a stop word from information of at least one first product. According to an embodiment, the processor 120 may obtain the at least one first product information. The at least one first product information may include the stop word which is unavailable information as the keyword. The processor 120 may remove at least one stop word from the at least one first product information. The processor 120 may provide accurate keyword information to the user of the electronic device 101 by removing the stop word from the product information. According to an embodiment, the processor 120 may parse a mark-up language file of the at least one first product information. The processor 120 may remove the stop word from the first product information based on a designated stop word list (or database) or a pre-stored stop word processing condition. Referring to FIG. 11, a user interface 1100 may be an example of at least one first product information with the stop word not removed. For example, the processor 120 may receive product information of shoes through the search application 210. The received product information of the shoes may include information relating to a brand, a price, a vendor, or a material which is information usable as the keyword. The received product information of the shoes may include information such as 'none', 'other', 'NULL' or 'See product detailed descriptions' which is the information unavailable as keywords. The processor 120 may identify the information not usable as the keyword in the received product information of the shoe. The processor 120 may remove the information not usable as the keyword from the received product information of the shoes. The processor 120 may display in the user interface 1100 by removing objects 1101 indicating the information not usable as the keywords from the received product information of the shoes.

In operation 1003, the processor 120 may identify a category relating to at least one first product. According to an embodiment, the processor 120 may identify a category including the first product in the at least one first product information. According to an embodiment, the processor 120 may receive from the server 108 category information including the at least one first product information together with the at least one first product information. According to an embodiment, the category including the at least one first product may be one or more.

In operation 1005, the processor 120 may identify a brand score in the identified category. According to an embodiment, the processor 120 may identify a confidence relating to a preferred product included in the identified category. The confidence of the preferred product may correspond to a value which quantifies the user's preference for the product.

TABLE 1

| category_name | preference_type | preference_value | confidence |
|---|---|---|---|
| 2 | 3 | Sneaker | 0.632 |
| 2 | 3 | Loafer | 0.423 |
| 2 | 3 | Boots | 0.242 |
| Sneaker | 1 | A | 0.632 |
| Sneaker | 1 | B | 0.423 |
| Sneaker | 1 | C | 0.242 |
| Loafer | 1 | D | 0.7 |
| Boots | 1 | E | 0.7 |

Table 1 may represent the product preference information (confidence) stored in the shopping preference database 240 based on the identified category. According to an embodiment, the category_name field may indicate a field storing a higher category name than information corresponding to preference_value. The category_name field may store information of a category name (e.g., sneaker, loafer, or boots) or an ID (e.g., 2) corresponding to the category name. According to an embodiment, the preference_type field may store information indicating whether the information stored in the preference value field is category information, or brand information. For example, if the category information is stored in the preference_value field, data (e.g., 3) indicating that the information stored in the preference_value is the category may be stored in the preference_type field. As another example, if the brand information is stored in the preference_value field, data (e.g., 1) indicating that the information stored in the preference_value is the brand may be stored in the preference_type field. According to an embodiment, the preference_value field may store information relating to a category name and a brand name. For example, the preference_value field may store information of the sneakers, loafers or boots category among the shoes. As another example, the preference_value field may store information of the brand A, B, C, D or E. According to an embodiment, the confidence field may store a confidence value which quantifies the user's preference. For example, a higher confidence field value may indicate a higher preference of the user of the electronic device 101. Table 1 corresponds to the example for representing the product preference information (confidence) stored in the shopping preference database 240 based on the identified category, but is not limited thereto. According to an embodiment, the product preference information may be stored as various values or in various forms.

According to an embodiment, the processor 120 may identify scores of the brands included in the at least one first product information. According to an embodiment, the processor 120 may arrange the at least one first product information, based on the recognition information of the visual object. The processor 120 may first display a product most similar to the visual object among the at least one first product information. According to an embodiment, the processor 120 may identify the scores of the brands based on the display order (similarity) in the at least one first product information.

TABLE 2

| index | key | score |
|---|---|---|
| 0 | A | 1.5 |
| 1 | B | 0.583 |
| 2 | C | 0.2 |

Table 2 may represent the scores of the brands identified based on the display order (similarity) in the at least one first product information. According to an embodiment, the index field may store information of values assigned in order from the highest brand score. The key field may store information corresponding to the brand name. The score field may store the score of the identified brand based on the display order (similarity) in the at least one first product information. For example, the processor 120 may arrange the at least one first product information, according to the similarity of the visual object and the at least one first product, based on the recognition information of the visual object. The processor 120 may identify that the at least one first product information is arranged in order of the brands A, A, B, B, and C. The processor 120 may assign the brand score corresponding to 1/n if the product order is n-th. The processor 120 may identify the brand A as the brand of the product having the highest similarity. The processor 120 may assign the brand score 1 to the brand A. The processor 120 may identify the brand A as the brand of the product having the second highest similarity. The processor 120 may additionally assign the brand score ½ to the brand A. The processor 120 may identify the brand B as the brand of the product of the third highest similarity. The processor 120 may assign the brand score ⅓ to the brand B. The processor 120 may identify the brand B as the brand of the product of the fourth highest similarity. The processor 120 may identify the brand B as the brand of the product having the fourth highest similarity. The processor 120 may additionally assign the brand score ¼ to the brand B. The processor 120 may identify the brand C as the brand of the product having the fifth highest similarity. The processor 120 may assign the brand C the brand score of ⅕. Finally, the processor 120 may calculate the brand score of each brand based on the brand score calculation result. The brand score of the brand A may correspond to 1.5, the brand score of the brand B may correspond to 0.583, and the brand score of the brand C may correspond to 0.2 through the brand score calculation. The processor 120 may identify that the brand score of the brand A is the highest in the at least one first product information.

Table 2 represents that the score of the identified brand is stored based on the display order (similarity) in the at least one first product information, but is not limited thereto. According to an embodiment, the brand score may be determined in various ways based on the display order. According to an embodiment, the brand score may be determined based on various criteria rather than the display order.

In operation 1007, the processor 120 may obtain a weight of a keyword based on product preference information (confidence) and the brand score. According to an embodiment, the processor 120 may acquire the weight of the keyword by calculating the product preference information and the brand information at a specific ratio. For example, in Table 1, in the shoes category, the confidence of the A brand, the confidence of the B brand, or the confidence of the C brand may be identified. The processor 120 may determine the confidence of the brand A to a product of the confidence (e.g., 0.632) of the sneakers in the shoes category and the confidence (e.g., 0.632) of the brand A in the sneakers category. The processor 120 may determine the confidence of the brand B to a product of the confidence (e.g., 0.632) of the sneakers in the shoes category and the confidence (e.g., 0.423) of the brand B in the sneakers category. The processor 120 may determine the confidence of the brand C to a product of the confidence (e.g., 0.632) of the sneakers in the shoes category and the confidence (e.g., 0.242) of the brand C in the sneakers category.

TABLE 3

| key | confidence |
|-----|------------|
| A | 0.399 |
| B | 0.267 |
| C | 0.096 |

Table 3 may indicate the confidence per brand in one category. According to an embodiment, the key field may store information corresponding to the brand name. The confidence field may store confidence information of each brand. Table 3 represents the confidence of each brand in one category, but is not limited thereto. According to an embodiment, the confidence of each brand in one category may be determined in various manners.

According to an embodiment, the processor 120 may identify weights of the keywords by calculating the confidence and the brand score of each brand at a specific ratio. For example, the processor 120 may identify the weight of the keyword by setting the brand score to 70% and the calculated brand confidence to 30%.

TABLE 4

| index | key | Value |
|-------|-----|-------|
| 0 | A | 1.1697 |
| 1 | B | 0.488 |
| 2 | C | 0.168 |

Table 4 may represent the weights of the keywords identified through Table 1, Table 2, and Table 3. According to an embodiment, the index field may store information of values assigned in order from the highest weight. The key field may store information corresponding to the keyword (brand). The value field may store information of the weight for each keyword. As the value of the value field rises, the processor 120 may identify as the brand having the higher user preference.

Table 4 represents the weights of the identified keywords by calculating the brand confidence and the brand score at the specific ratio, but is not limited thereto. According to an embodiment, the brand score may be determined in various manners. According to an embodiment, the processor 120 may obtain the weight of the keyword by calculating the brand confidence and the brand score at different ratios according to various situations.

In operation 1009, the processor 120 may obtain at least one keyword based on the weight of the keyword. According to an embodiment, the processor 120 may obtain a keyword of which the keyword weight is equal to or greater than a specific criterion as at least one keyword. For example, in Table 4, the processor 120 may obtain a keyword A (brand A) and a keyword B (brand B) of which the keyword weight exceeds 0.4 as at least one keyword. According to an embodiment, the processor 120 may display the obtained at least one keyword in the user interface.

Figure 12:
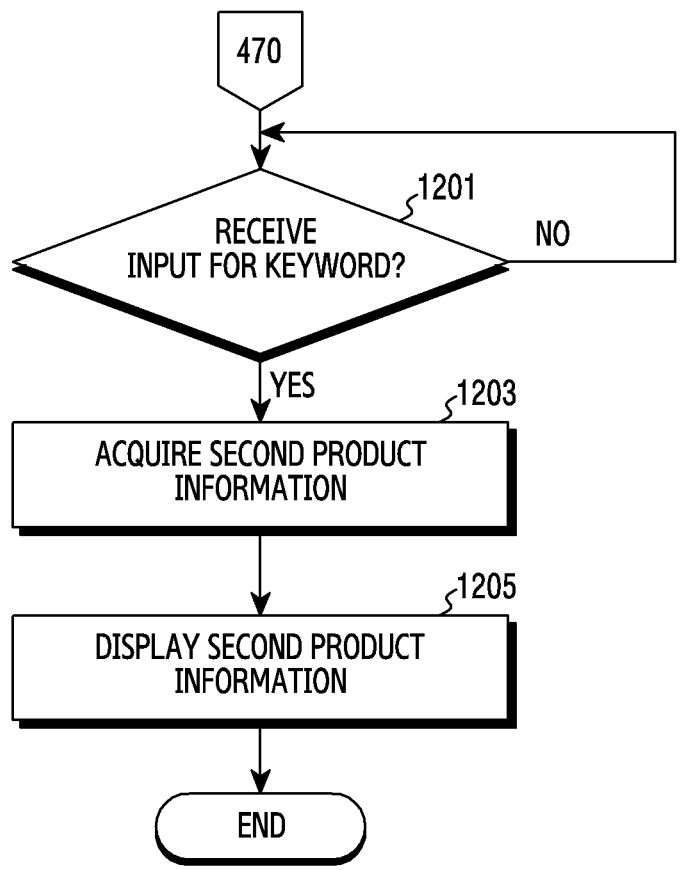
FIG. 12 illustrates an example of operations of an electronic device for displaying second product information through keywords according to various embodiments.

FIG. 12 illustrates an example of operations of an electronic device 101 for displaying second product information through keywords according to various embodiments. Such operations may be fulfilled by the electronic device 101 shown in FIG. 1, the electronic device 101 shown in FIG. 2, or the processor 120 of the electronic device 101.

FIG. 12 may be performed after operation 470 of FIG. 4.

Referring to FIG. 12, in operation 1201, the processor 120 may identify whether an input for one keyword of at least one keyword information displayed on the display device 160 of the electronic device 101 is received. According to an embodiment, the at least one keyword information may include a keyword and a shape of an object corresponding to the keyword.

According to an embodiment, the processor 120 may identify a type of the keyword for which the input is received. For example, the processor 120 may identify whether the preference brand keyword 711 is selected. As another example, the processor 120 may identify whether the general brand keyword 712 is selected. As yet another example, the processor 120 may identify whether the category keyword 730 is selected. As still another example, the processor 120 may identify whether the shopping tendency keyword 750 is selected. As further example, the processor 120 may identify whether the preference price search keyword 770 is selected.

According to an embodiment, the input may include a touch input for a touch panel of the electronic device 101. For example, the touch input may include one or more of a single tab input for the touch panel of the electronic device 101, a multiple taps input for the touch panel, a drag input for the touch panel, a swipe input for the touch panel, or a depression input for the touch panel.

In operation 1203, the processor 120 may acquire information of a second product, in response to receiving an input for one keyword of the at least one keyword. According to an embodiment, the processor 120 may request the second product information from the server 108, in response to receiving the input for one keyword of the at least one keyword. The server 108 may transmit the second product information to the electronic device 101. The processor 120 may receive the second product information from the server 108. According to an embodiment, in response to receiving the input for one keyword of the at least one keyword, the processor 120 may obtain information of the second product of the same category as the first product. According to an embodiment, in response to receiving the input for one keyword of the at least one keyword, the processor 120 may obtain information of a second product different from the category of the first product.

According to an embodiment, if the processor 120 receives an input for the brand keyword 710, the processor 120 may obtain the second product information of the brand related to the inputted brand keyword 710 from the server 108. The processor 120 may display the second product information of the brand related to the inputted brand keyword 710 together with the first product information. According to an embodiment, if receiving an input for the category keyword 730, the processor 120 may filter and display the first product information with a category related to the inputted category keyword 730.

Figure 13:
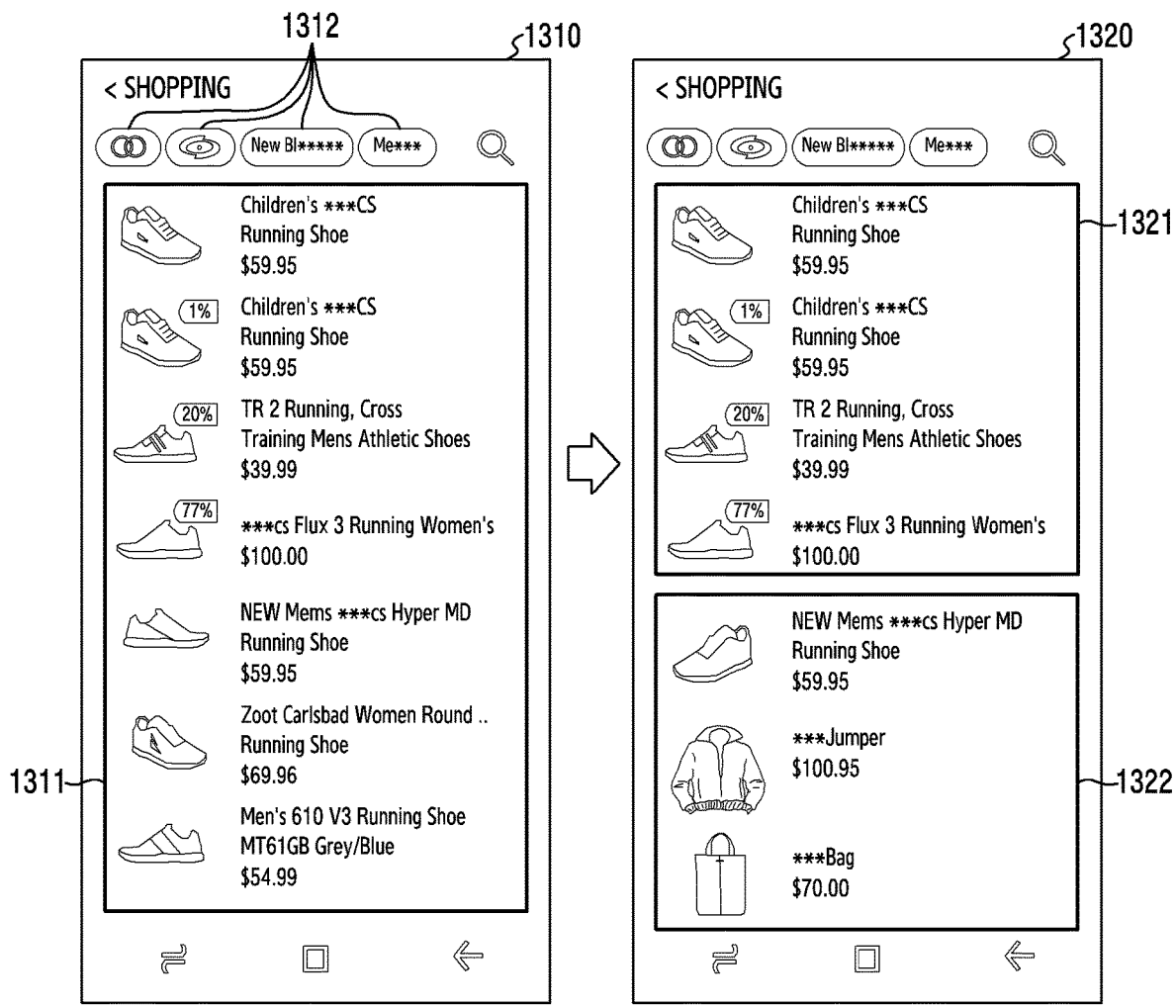
FIG. 13 illustrates an example of operations for displaying second product information according to an input for keywords in an electronic device according to various embodiments.

In operation 1205, the processor 120 may display the second product information on the display device 160 of the electronic device 101. According to an embodiment, the processor may display some of the first product information in a first area of the user interface. According to an embodiment, the processor 120 may display the second product information in a second area of the user interface. According to an embodiment, the processor 120 may display the second product information related to the inputted keyword, of the same category as the category of the first product, in the second area of the user interface. According to an embodiment, the processor 120 may display the second product information related to the inputted keyword, of the different category from the category of the first product, in the second area of the user interface. FIG. 13 illustrates an example of an operation for displaying second product information according to an input for keywords in the electronic device 101 according to various embodiments. Referring to FIG. 13, for example, the processor 120 may display shoes brand keywords 1312 in a user interface 1310 together with shoes information 1311 which is a first product. The processor 120 may display the shoes brand keywords 1312 through texts or brand logos. The shoes brand keywords 1312 may include the preference brand keyword 711 or the general brand keyword 712. The processor 120 may receive an input for one of at least one keyword. The processor 120 may display second product information corresponding to the inputted keyword in a second area 1322 of the user interface 1320, in response to receiving the input for one of the at least one keyword. The processor 120 may display the first product information 1311 in a first area 1321 of the user interface 1320, in response to receiving the input for one of the at least one keyword. As another example, the processor 120 may display the second product information related to the keyword selected in the shoes category in the second area 1322 of the user interface 1320. As another example, in response to receiving an input for one of the at least one keyword, the processor 120 may display second product information related to the selected keyword of the jumper or bag category other than the shoes category in the second area 1322 of the user interface 1320. As yet another example, in response to receiving an input for one of the at least one keyword, the processor 120 may obtain second product information corresponding to the inputted keyword in the first product information, and display in the user interface 1320. As still another example, in response to receiving an input for one of the inputted at least one keyword, the processor 120 may display second product information corresponding to one of the inputted at least one keyword in both of the first area 1321 and the second area 1322.

Figure 14:
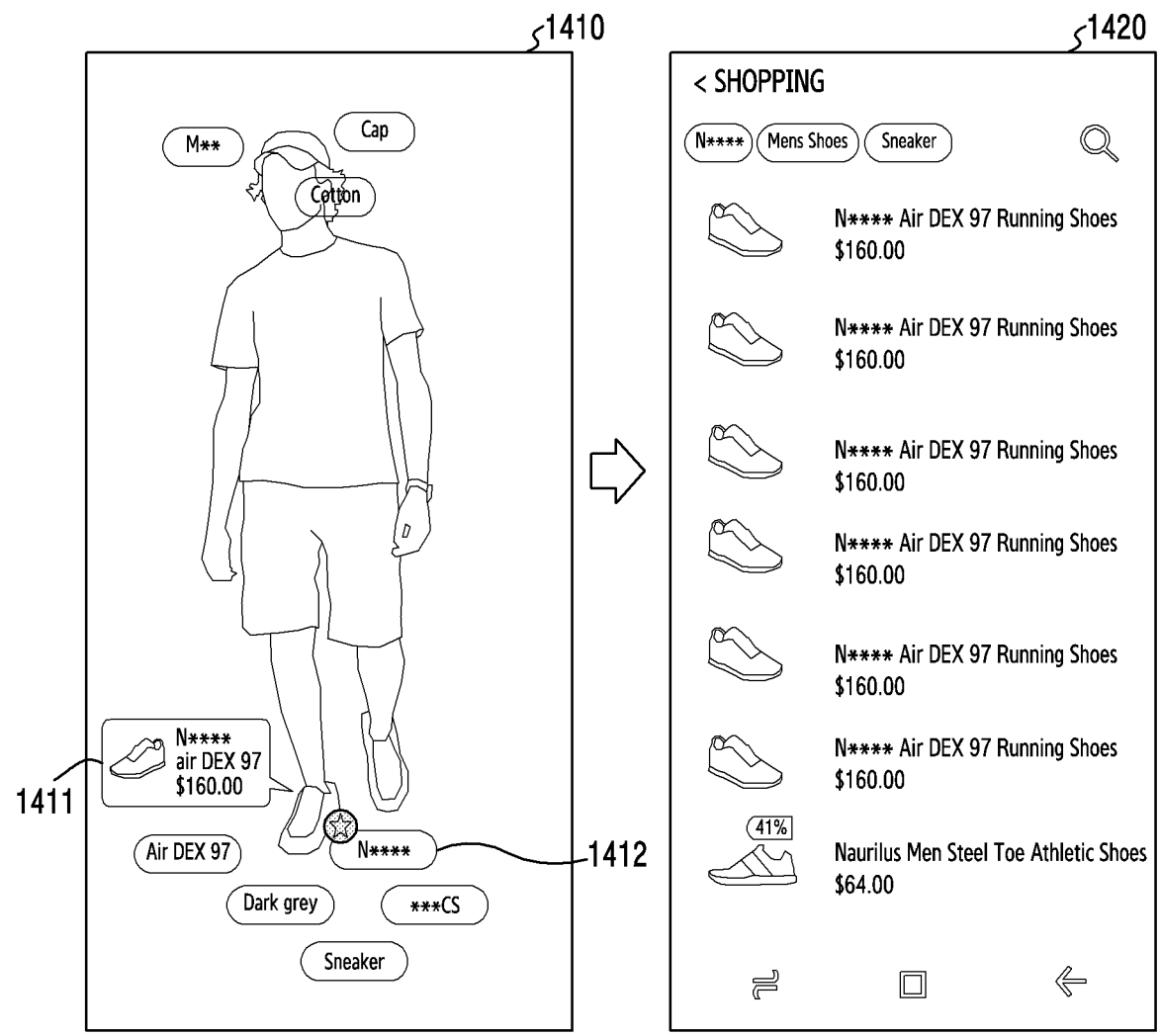
FIG. 14 illustrates an example of operations of an electronic device for displaying information of a plurality of products according to various embodiments.

FIG. 14 illustrates an example of operations of an electronic device 101 for displaying information of a plurality of products according to various embodiments.

Referring to FIG. 14, the processor 120 may acquire an image including a plurality of external objects (e.g., a hat or shoes) through the camera module 180 of the electronic device 101. The processor 120 may transmit the image to an external electronic device (e.g., the server 108). The processor 120 may receive information of products related to the external objects from the external electronic device. The processor 120 may identify user's preference category information and preference brand information, based on the usage record related to the product of the user of the electronic device 101. The processor 120 may determine weights for the one or more keywords using the preference category information and the preference brand information. The processor 120 may determine at least some keywords having the weights which satisfy a specified condition (e.g., the weight is equal to or greater than a specific condition) of the one or more keywords. The processor 120 may display the determined keyword around visual objects corresponding to the plurality of the objects in the image including the plurality of the external objects. For example, the processor 120 may acquire an image including a visual object representing a hat and a visual object representing shoes in the image. The processor 120 may display a brand of the hat or a brand preferred by the user around the visual object representing the hat. The processor 120 may display a brand of the shoes or a user's preferred brand among the shoes around the visual object representing the shoes in a user interface 1410. According to an embodiment, the processor 120 may additionally display an object 1412 indicating the preference brand keyword 711 of the electronic device 101. For example, the processor 120 may additionally display a star for the object 1412 indicating the preference brand keyword 711. However, this is merely exemplary, and embodiments of the present invention are not limited thereto. For example, the processor 120 may display the object 1412 indicating the preference brand keyword 711 in a different color from the other keywords.

According to an embodiment, if identifying accurate product information of the external object (e.g., shoes), the processor 120 may display an object 1411 indicating the accurate product information around a visual object representing the external object. According to an embodiment, the processor 120 may identify an external object (e.g., shoes) of a category which the user of the electronic device 101 prefers among the plurality of the external objects (e.g., a hat or shoes). The processor 120 may display the keyword related to the external object more than the keywords related to the other external objects around the visual object representing the external object of the category which the user of the electronic device 101 prefers. According to an embodiment, the processor 120 may differently display a color of the keyword related to the external object around the visual object representing the external object of the category which the user of the electronic device 101 prefers. According to an embodiment, the processor 120 may identify the external object (e.g., shoes) of the brand which the user of the electronic device 101 prefers among the plurality of the external objects (e.g., a hat or shoes). The processor 120 may display the keyword related to the external object around the visual object representing the external object of the brand which the user of the electronic device 101 prefers.

According to an embodiment, the processor 120 may receive an input for one of a plurality of keywords displayed in the user interface 1410. In response to the input, the processor 120 may display product information corresponding to the inputted keyword in the user interface 1420.

Figure 15:
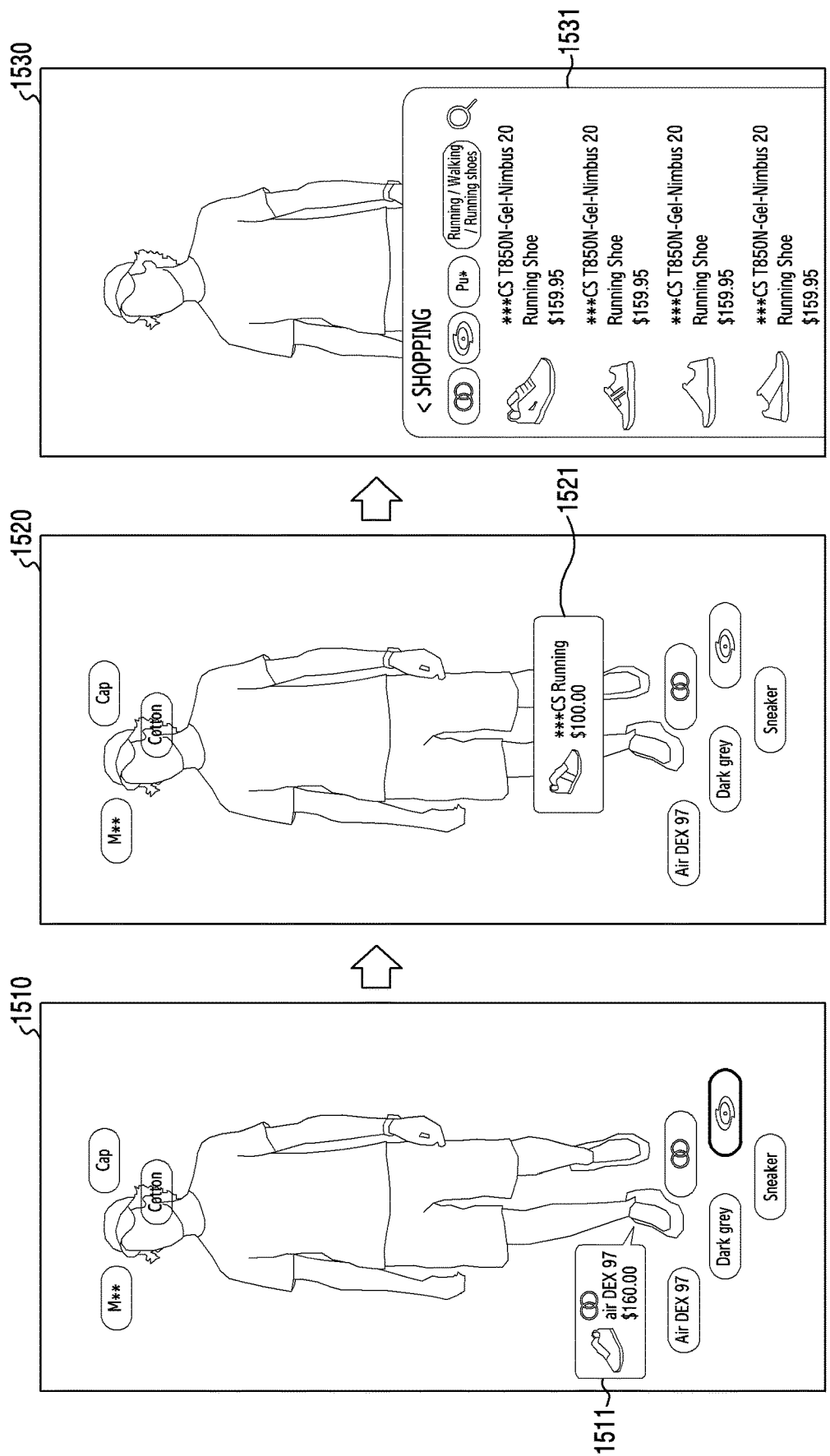
FIG. 15 illustrates an example of operations of an electronic device for searching for and displaying a product through voice recognition according to various embodiments.

FIG. 15 illustrates an example of operations of an electronic device 101 for searching for and displaying a product through voice recognition according to various embodiments.

Referring to FIG. 15, the processor 120 may acquire an image including an external object (e.g., shoes) through the camera module 180 of the electronic device 101. The processor 120 may receive a voice input of the user of the electronic device 101 through the input device 150 (e.g., a microphone) of the electronic device 101. The processor 120 may receive a request for displaying product information of the external object from the user. For example, the processor 120 may receive a user's request such as "Find shoes information of the picture" from the user of the electronic device 101 through the microphone of the electronic device 101. According to an embodiment, in response to the request, the processor 120 may display, in the user interface 1510, an object 1511 representing the product information of the external object around the visual object representing the external object. The processor 120 may display a keyword related to the external object in the user interface 1510 together with the visual object 1511 representing the product information of the external object. According to an embodiment, the processor 120 may display the keyword related to the external object as an object (e.g., a brand logo) representing a text or a brand.

According to an embodiment, while displaying the user interface 1510, the processor 120 may receive an input for one of the keywords related to the external object through a voice input. For example, the processor 120 may receive from the user a user request such as "Find brand B" through the microphone of the electronic device 101. According to an embodiment, in response to receiving an input for one of the keywords related to the external object, the processor 120 may display an object 1521 in a user interface 1520 for indicating product information related to the received keyword. For example, in response to receiving a user's request such as "Find with brand B" from the user, the processor 120 may display a product of the brand B which is similar to the external object in shape, color, or size.

According to an embodiment, the processor 120 may receive an input for requesting additional product information through a voice input while displaying the user interface 1520. In response to the request, the processor 120 may display the additional product information in a first area 1531 of the user interface 1530. The processor 120 may display keywords related to the additional product information along with the additional product information. For example, in response to receiving a user request such as "Find more with brand B" from the user, the processor 120 may display additional product information of the brand B.

Figure 16:
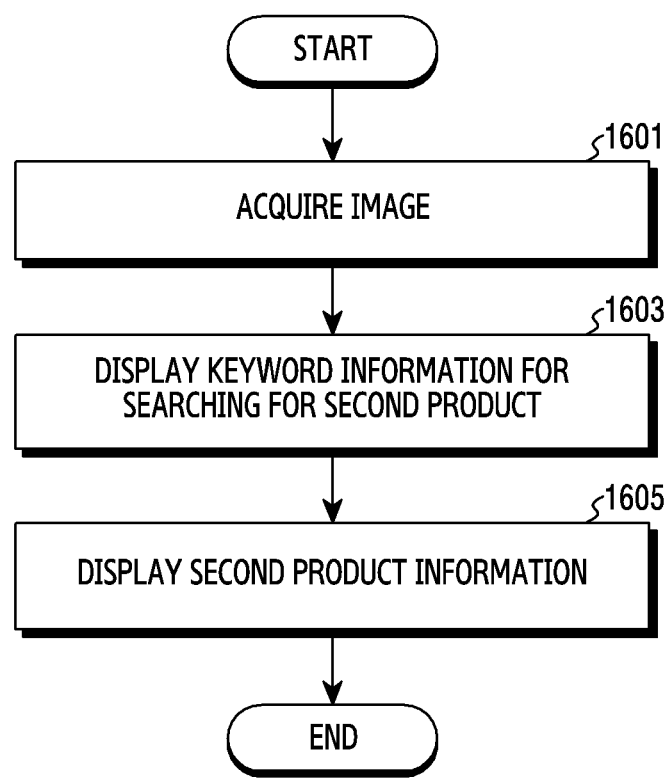
FIG. 16 illustrates another example of operations of an electronic device according to various embodiments.

FIG. 16 illustrates another example of operations of an electronic device 101 according to various embodiments.

Referring to FIG. 16, in operation 1601, the processor 120 may acquire an image including a visual object corresponding to an external object by using the camera module 180 of the electronic device 101. According to an embodiment, the processor 120 may acquire an image including visual objects corresponding to a plurality of external objects. According to an embodiment, the processor 120 may acquire an image including a visual object corresponding to an external object using the camera module 180 in the user interface of the search application 210. According to an embodiment, the image including the visual object corresponding to the external object may correspond to a captured image or a preview image acquired using the camera module 180 of the electronic device 101. According to an embodiment, the external object may include a product, a text, and a brand logo around the electronic device 101.

In operation 1603, based on obtaining recognition information of the visual object, the processor 120 may display keyword information for searching for a second product included in a category of a first product and having a different shape distinguished from the shape of the visual object together with the first product information having the shape corresponding to the shape of the visual object.

According to an embodiment, the processor 120 may identify recognition information of the visual object included in the image. The processor 120 may extract feature points of the visual object included in the image. The processor 120 may obtain first product information, based on the extracted feature points. For example, the processor 120 may identify at least one of a shape, a color, a size, a brand or a design corresponding to the feature points of the visual object corresponding to the shoe. The processor 120 may identify at least one of a brand, a size, a color, and a design of the shoe, based on the feature points of the visual object corresponding to the shoe.

According to an embodiment, the first product information may include at least one information of product name information, vendor information, and price information. According to an embodiment, the shape of the visual object may include at least one of the shape, the size, the color, the style, and the brand logo of the visual object. According to an embodiment, the keyword information for searching for the second product may include a keyword (e.g., text) or a shape (e.g., a brand logo) of an object corresponding to the keyword. According to an embodiment, the processor 120 may display the keyword information around the visual object corresponding to the external object. According to an embodiment, the processor 120 may display the keyword information in the first area of the user interface of the electronic device 101. The processor 120 may display the first product information in the second area of the user interface of the electronic device 101.

In operation 1605, the processor 120 may display the second product information based on receiving an input for the keyword. According to an embodiment, the second product information may include at least one information of brand name information, vendor information, and price information. According to an embodiment, the processor 120 may obtain the second product information of the same category as the first product, based on receiving an input for the keyword. According to an embodiment, in response to receiving the input for the keyword, the processor 120 may obtain second product information different from the category of the first product. According to an embodiment, the processor may display some of the first product information in the first area of the user interface. According to an embodiment, the processor 120 may display the second product information in the second area of the user interface.

As described above, if the user of the electronic device 101 performs the product search, the electronic device 101 according to various embodiments may display the keywords related to the product together, based on the usage history. The electronic device 101 according to various embodiments may increase serviceability by displaying the keyword related to the product. Even if the user of the electronic device 101 receives an undesired search result, the electronic device 101 according to various embodiments may increase the serviceability, by allowing the user to perform a secondary search through keywords. If the user of the electronic device 101 executes the keyword search, the electronic device 101 according to various embodiments may display a product searched in the search result, a product related to the keyword of the same category as the search product or a product related to the keyword of a different category from the search product. The electronic device 101 may provide an enhanced user experience, and increase the serviceability of the search application.

The methods according to the embodiments described in the claims or the specification of the present disclosure may be implemented in software, hardware, or a combination of hardware and software.

As for the software implementation, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Thus, the scope of the present disclosure is not limited and defined by the described embodiment and is defined not only the scope of the claims as below but also their equivalents.

The invention claimed is:

1. An electronic device comprising:
a communication circuit;
a database storing usage records of products of a user of the electronic device;
a display; and
a processor, wherein the processor is configured to,
acquire an image of an external object,
transmit the image to an external electronic device, so that the external electronic device transmits product information related to the external object included in the image to the electronic device, using the communication circuit,
display the product information in a first part of the display;
parsing a mark-up language file of the product information to determine one or more keywords, wherein parsing includes removing at least one stop word which is not usable as a keyword for a selectable object on a user interface,
identify preference category information and preference brand information of the user, based on a usage record of a product of the user stored in the database, the product being related to the product information,
determine weights for the one or more keywords, using the preference category information and the preference brand information,
display one or more selectable objects in a second part of the display, the one or more selectable objects corresponding to at least some of the one or more keywords having weights which satisfy a specified condition, and
based on a user input selecting an object of the one or more selectable objects, performing a search using a keyword of the at least some of the one or more keywords corresponding to the object.

2. The electronic device of claim 1, wherein the processor is configured to,
remove the at least one stop word, based on a predesignated stop word list or stop word processing condition.

3. The electronic device of claim 1, wherein the processor is configured to,
differently display and provide an object representing the at least some of the one or more keywords together with the product information, on the display, based on the preference category information or the preference brand information.

4. The electronic device of claim 1, wherein the processor is configured to,
provide at least some keywords exceeding a predesignated weight or the at least some of the one or more keywords having a predesignated number according to a weight magnitude among the one or more keywords, through the display.

5. The electronic device of claim 1, wherein the processor is configured further to,
update the preference category information and the preference brand information of the user, based on the product information transmitted from the external electronic device.

6. The electronic device of claim 1, further comprising:
a camera,
wherein the processor is configured to acquire the image of the external object by using the camera or to obtain the image comprising the external object among images stored in the electronic device.

7. A method in an electronic device, comprising:
acquiring an image of an external object;
transmitting the image to an external electronic device, so that the external electronic device transmits product information related to the external object included in the image to the electronic device;
displaying the product information in a first part of a display;
parsing a mark-up language file of the product information to determine one or more keywords, wherein parsing includes removing at least one stop word which is not usable as a keyword for a selectable object on a user interface;
identifying preference category information and preference brand information of a user, based on a usage record of a product of the user stored in a database, the product being related to the product information;
determining weights for the one or more keywords, using the preference category information and the preference brand information;
displaying one or more selectable objects in a second part of the display, the one or more selectable objects corresponding to at least some of the one or more keywords having weights which satisfy a specified condition, and
based on a user input selecting an object of the one or more selectable objects, performing a search using a keyword of the at least some of the one or more keywords corresponding to the object.

8. The method of claim 7, comprising:
removing the at least one stop word, based on a predesignated stop word list or stop word processing condition.

9. The method of claim 7, comprising:
differently displaying and providing an object representing the at least some of the one or more keywords together with the product information, on the display, based on the preference category information or the preference brand information.

10. The method of claim 7, comprising:
providing at least some keywords exceeding a predesignated weight or the at least some of the one or more keywords having a predesignated number according to a weight magnitude among the one or more keywords, through the display.

11. The method of claim 7, comprising:
updating the preference category information and the preference brand information of the user, based on the product information transmitted from the external electronic device.

12. The electronic device of claim 1, wherein identifying the preference category information and preference brand information of the user comprises making a determination of a number of times that the user purchased one or more brands and making a determination of a number of times that the user performed a search for the one or more brands.

* * * * *